US010256906B2

(12) United States Patent
Brandt-Pearce et al.

(10) Patent No.: US 10,256,906 B2
(45) Date of Patent: Apr. 9, 2019

(54) POSITION LOCALIZATION USING VISIBLE LIGHT COMMUNICATION

(71) Applicant: University of Virginia Patent Foundation, Charlottesville, VA (US)

(72) Inventors: Maite Brandt-Pearce, Free Union, VA (US); Zafer Vatansever, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 0 days.

(21) Appl. No.: 15/840,690

(22) Filed: Dec. 13, 2017

(65) Prior Publication Data

US 2018/0167140 A1 Jun. 14, 2018

Related U.S. Application Data

(60) Provisional application No. 62/433,379, filed on Dec. 13, 2016, provisional application No. 62/434,051, (Continued)

(51) Int. Cl.
*H04B 10/116* (2013.01)
*H04B 10/114* (2013.01)
(Continued)

(52) U.S. Cl.
CPC .......... *H04B 10/116* (2013.01); *G01S 5/16* (2013.01); *H04B 10/1149* (2013.01); *H04B 10/502* (2013.01); *H04B 10/66* (2013.01)

(58) Field of Classification Search
None
See application file for complete search history.

(56) References Cited

U.S. PATENT DOCUMENTS

2014/0186026 A1* 7/2014 Oshima ............... H04B 10/116
398/25
2016/0047890 A1* 2/2016 Ryan ....................... G01S 5/16
398/118

OTHER PUBLICATIONS

Arulampalam, M. Sanjeev, et al., "A Tutorial on Particle Filters for Online Nonlinear/Non-Gaussian Bayesian Tracking", IEEE Transactions on Signal Processing, vol. 50, No. 2, (Feb. 2002), 174-187.
(Continued)

*Primary Examiner* — Richard M Camby
(74) *Attorney, Agent, or Firm* — Schwegman Lundberg & Woessner, P.A.

(57) ABSTRACT

Visible-light communication (VLC) is an optical wireless communication technique that uses light emitting diodes (LEDs) or other optical sources to transmit information to a user equipment (UE) device. An optically-based location determination approach, such as using VLC infrastructure, can meet a desire for location-based services where use of VLC can provide a solution to an indoor localization or navigation problem. A fingerprinting approach can include use of an optical received signal strength (RSS) or other information (e.g., an image of a scene) to generate a spatial fingerprint map of an area. A later-received RSS on the UE device and the prior-generated fingerprint map representative of RSS can be received, and a fingerprint map and RSS observations can be provided as inputs to a Bayesian filter, such as an Extended Kalman Filter (EKF) or a Particle Filter, to provide an estimated position for the UE device.

25 Claims, 13 Drawing Sheets

Related U.S. Application Data filed on Dec. 14, 2016, provisional application No. 62/596,340, filed on Dec. 8, 2017.

(51) Int. Cl.
*H04B 10/50* (2013.01)
*G01S 5/16* (2006.01)
*H04B 10/66* (2013.01)

(56) References Cited

OTHER PUBLICATIONS

Do, Trong-Hop, et al., "An in-Depth Survey of Visible Light Communication Based Positioning Systems", sensors 16, 678, (2016), 40 pgs.

Ganti, Divya, et al., "VLC-based Indoor Positioning System with Tracking Capability Using Kalman and Particle Filters", 2014 IEEE International Conference on Consumer Electronics (ICCE), (2014), 476-477.

Gu, Wenjun, et al., "Indoor Visible Light Positioning System with Multipath Reflection Analysis", 2016 IEEE International Conference on Consumer Electronics (ICCE), (2016), 89-92.

Kahn, Joseph M., et al., "Wireless Infrared Communications", Proceedings of the IEEE, vol. 85, No. 2, (Feb. 1997), 265-298.

Komine, Toshihiko, et al., "Fundamental Analysis for Visible-Light Communication System using LED Lights", IEEE Transactions on Consumer Electronics, vol. 50, No. 1, (Feb. 2004), 100-107.

Kuo, Ye-Sheng, et al., "Demo—Luxapose: Indoor Positioning with Mobile Phones and Visible Light", 3 pgs.

Rahaim, Michael, et al., "State Estimation and Motion Tracking for Spatially Diverse VLC Networks", 3rd IEEE Workshop on Optical Wireless Communications, (2012), 1249-1253.

Saha, Nilanjan, et al., "Extended Kalman filters using explicit and derivative-free local linearizations", Applied Mathematical Modelling 33, (2009), 2545-2563.

Vongkulbhisal, Jayakorn, "A Fingerprinting-Based Indoor Localization System Using Intensity Modulation of Light Emitting Diodes", Microwave and Optical Technology Letters, vol. 54, No. 5, (May 2012), 1218-1227.

Zhang, Weizhi, et al., "Asynchronous indoor positioning system based on visible light communications", Optical Engineering 53 (4), (Apr. 2014), 10 pgs.

\* cited by examiner

POSITION LOCALIZATION USING VISIBLE LIGHT COMMUNICATION

CLAIM OF PRIORITY

This patent application claims the benefit of priority of each of (1) Brandt-Pearce et al., U.S. Provisional Patent Application Ser. No. 62/433,379, entitled "System for Indoor Positioning Using Visible Light Communications and Related Method Thereof," filed on Dec. 13, 2016; (2) Brandt-Pearce et al., U.S. Provisional Patent Application Ser. No. 62/434,051, entitled "System for Indoor Positioning Using Visible Light Communications and Related Method Thereof," filed on Dec. 14, 2016; and (3) Brandt-Pearce et al., U.S. Provisional Patent Application Ser. No. 62/596,340, entitled "System for Indoor Positioning Using Visible Light Communications and Related Method Thereof," filed on Dec. 8, 2017; each of which is hereby incorporated by reference herein in its respective entirety.

FIELD OF THE DISCLOSURE

This document pertains generally, but not by way of limitation, to apparatus and techniques for wireless communication, and more particularly to apparatus and techniques for user equipment (UE) position localization using an optical communication system.

BACKGROUND

The availability of wireless mobile devices creates an opportunity for location-based services (LBS). The quality of LBS may generally rely on accurate positioning and tracking systems, such as within an enclosed area. For outdoor areas, a Global Navigation Satellite System (GNSS) can be used. GNSS signals, such as Global Positioning System (GPS) signals, are generally not accurate in indoor areas due to obstructions and diffusion. In particular, GPS signals are generally subject to attenuation and losses in indoor environments since the signals poorly penetrate through buildings, walls, and other obstacles. Such attenuation can render GPS inaccurate for indoor localization.

Visible light communication (VLC) may provide another technique for use in indoor localization such as indoor position determination. Generally, VLC does not create electromagnetic (EM) interference, visible light is not harmful to living creatures, and the capital expenditures for VLC-tracking systems are lower than other systems. Light emitting diodes (LED) used in VLC-tracking can provide a larger number of physical access points as compared to corresponding systems implementing using non-light-based techniques, such as Wi-Fi as specified in the IEEE 802.11 family of wireless local area network standards. LEDs are replacing traditional incandescent and compact fluorescent lamps, and generally consume less power. LEDs also offer high life expectancy in comparison to other lighting technologies. As illustrative examples, VLC systems can be used in interior spaces, such as shopping malls, museums, warehouses, military and industrial facilities, and hospitals, such as in locations where radio-frequency (RF)-based systems are disallowed or disfavored due to interference or electromagnetic compatibility concerns. The competition for bandwidth between communication and navigation purposes can pose a challenge for RF-based systems, and such a challenge may be reduced or eliminated by use of an optical system.

SUMMARY OF THE DISCLOSURE

Visible-light communication (VLC) is an optical wireless communication technique that uses light emitting diodes (LEDs) or other optical sources to transmit information to a user equipment (UE) device. The present inventors have recognized, among other things, that an optically-based location determination approach, such as using VLC infrastructure, can meet a desire for location-based services (LBS) (which can also be referred to as position-based services (PBS)), where use of VLC can provide a solution to an indoor localization or navigation problem.

Indoor positioning techniques that use VLC can be divided into three approaches: triangulation, fingerprinting or scene-based approaches, and proximity-based techniques. In a triangulation approach, the geometry of the transmitter and receiver is used for positioning; for example, a distance or angular information between known reference locations and the target can be used to solve a least squares-based trilateration equation. In a fingerprinting approach, information representative of a received signal strength (RSS) can be used to generate a spatial fingerprint map of an area. A later-received RSS on the UE device and the prior-generated fingerprint map representative of RSS can be received. As an illustrative example, LED arrays that diffuse light, such as chandeliers or other luminaires, and their associated fingerprint map that contains the RSS values can be used in conjunction with a Bayesian filter, such as an Extended Kalman Filter (EKF). In a proximity-based approach, LEDs with known positions and known IDs are used to match the received signal measured by the UE to a nearby LED.

An approach exclusively based on triangulation or trilateration can present challenges. Generally, at least three line-of-sight (LOS) optical transmitters are needed to perform trilateration using optical transmitters, and such an approach generally requires a technique such as like angle-of-arrival (AOA) or time-of-arrival (TOA). By contrast, the approaches described herein can perform localization without requiring LOS (e.g., providing non-line-of-sight (NLOS) position localization). The present inventors have recognized that optical communication systems can incorporate or use Bayesian state estimation tools to solve a UE device tracking problem, such as within an indoor region. In particular, an extended Kalman filter (EKF) or particle filter (PF) can be used for indoor target tracking. Such tracking can include using a diffuse lamp model, without requiring knowledge of a spatial geometry between the optical transmitter and a receiver.

Various examples described herein also relate to apparatus and techniques that can be used to generate scene information, such as a fingerprint map of a location served by the optical transmitters, for use as an input for the Bayesian estimator for use in estimating localization information such as UE device position, velocity, or acceleration, as illustrative examples. Generation of the fingerprint map can be accomplished using one or more of UE devices, or sensors included as a portion of an optical transmitter assembly such as a luminaire. Position information derived from non-optical techniques, such as wireless network trilateration information, can be used to assist in generating a fingerprint map. Sampled information indicative of an optical power distribution within a region served by the optical transmitter can be aggregated, such as to achieve "crowd-sourced" generation of a fingerprint map for contemporaneous or later use in localization of a UE device.

An example (such as an apparatus, a method, a means for performing acts, or a device readable medium including instructions that, when performed by the device, can cause the device to perform acts), can include or can use a system, comprising an optical transmitter circuit, the optical transmitter configured to modulate light provided by an optical emitter to provide an optical communication signal, a receiver circuit configured to receive information indicative of a measured characteristic of the light emitted from the optical emitter, the measured characteristic obtained from a user equipment (UE) device separate from the optical transmitter, a location determination circuit comprising a memory circuit and a processor circuit, the memory circuit including information indicative of a fingerprint map of a region containing the UE device, the memory circuit comprising instructions that, when executed by the processor circuit, cause the location determination circuit to estimate, using a Bayesian estimator, a spatial location of the UE device within the region using the fingerprint map and the measured characteristic obtained from the user device. The measured characteristic can be provided as an input to the Bayesian estimator without requiring conversion of the input into a spatial representation of the measured characteristic. The fingerprint map includes a mapping of values representing optical intensity to spatial locations within the region.

Another example can include, or can optionally be combined with the subject matter of one or any combination of other examples in this document, to provide subject matter (such as an apparatus, a method, a means for performing acts, or a non-transitory machine readable medium including instructions that, when performed by the machine, that can cause the machine to perform acts, including an automated method for estimating a spatial location of a user equipment (UE) device, the method comprising receiving a fingerprint map of a region containing the UE device, receiving information indicative of a measured characteristic of light emitted from an optical emitter comprising a portion of an optical transmitter, the optical transmitter to modulate light provided by the optical emitter, estimating, using a Bayesian estimator, a spatial location of the UE device within the region using the fingerprint map and the measured characteristic obtained from the user device. Again, the measured characteristic can be provided as an input to the Bayesian estimator without requiring conversion of the input into a spatial representation of the measured characteristic, and the fingerprint map includes a mapping of optical intensity values to spatial locations within the region.

As mentioned elsewhere herein, the apparatus or methods mentioned above and elsewhere can include using of a Bayesian estimator comprising an extended Kalman filter (EKF), or a particle filter (PF). In an EKF implementation, the measured characteristic (e.g., optical received signal strength) can be linearized using a finite-difference technique.

This summary is intended to provide an overview of subject matter of the present patent application. It is not intended to provide an exclusive or exhaustive explanation of the invention. The detailed description is included to provide further information about the present patent application.

Figure 1:
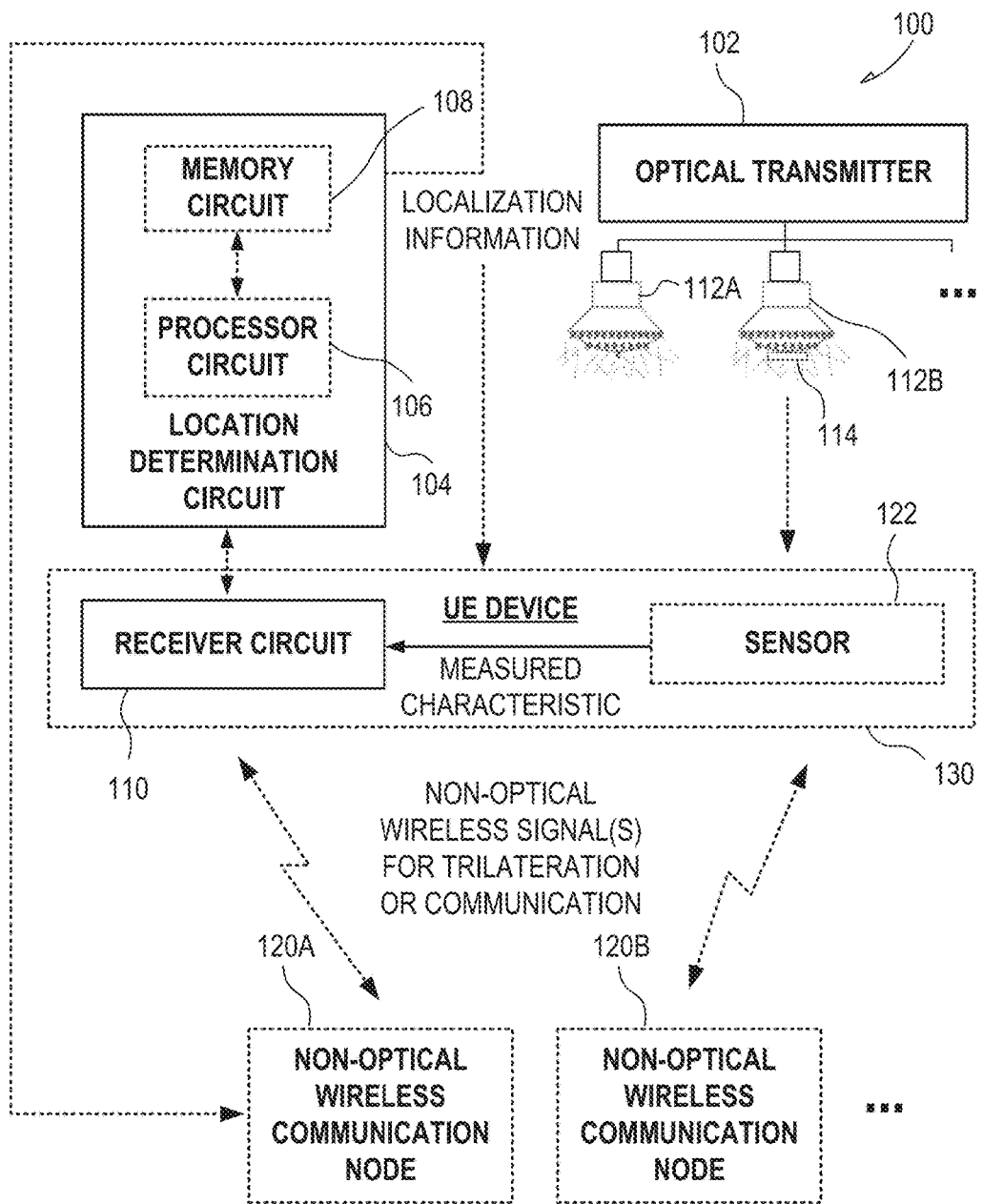
FIG. 1 illustrates generally a system that can include an optical transmitter, a receiver circuit, and a location determination circuit, such as can be used to provide location-based services for a user equipment (UE) device in a region served by the optical transmitter.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As mentioned above, in one approach, an optically-based trilateration technique can be used for localization of a user equipment (UE) device, such as within an indoor space. Such a trilateration approach generally relies on an estimated distance between various optical transmitters and a receiver. Non-line-of-sight (NLOS) transmission pathways can hinder or even entirely inhibit use of a trilateration-based approach, without more. By contrast, the present inventors have developed apparatus and techniques involving a Bayesian estimator—such as an extended Kalman Filter (EKF) or Particle Filter (PF)—to provide improved performance (e.g., location determination accuracy) as compared to other approaches such as trilateration, particularly when NLOS signal components are present. The apparatus and techniques described herein can be used with diffuse optical sources or in scenarios where unknown shadowing can occur between sources and a receiver whose location is being estimated.

Such techniques are also applicable where variations in signal-to-noise ratio occur (such as due to other sources including daylight). According to various examples described herein, localization of a target such as UE device can be performed using a technique involving, for example, three aspects. A first aspect is calibration, and such calibration can be performed offline. A spatial distribution of optical power (e.g., a fingerprint map) can be constructed using one or more of an analytical model or measured information. A second aspect can include receiving information indicative of a measured characteristic from the device being tracked. For example, an optical signal strength (e.g., light power) can be measured by a UE device using an imaging sensor or a photodetector. Such a measured characteristic can then be used as an input to a Bayesian estimate such as including an EKF or PF. Use of an EKF can involve linearization of information indicative of the measured characteristic, such as using a finite-difference technique. A third aspect can include updating the fingerprint map, such as to capture changing conditions in the area served by an optical transmitter.

FIG. 1 illustrates generally a system 100 that can include an optical transmitter 102, a receiver circuit 110, and a location determination circuit 104, such as can be used to provide location-based services for a user equipment (UE) device 130 in a region served by the optical transmitter 102. The location determination circuit 104 can be included as a portion of visible light communication (VLC) infrastructure, such as included as a portion of an optical transmitter assembly or base-station coupled to multiple transmitter assemblies. In another example, the location determination circuit 104 can be included as a portion of the UE device 130. For example, information indicative of a fingerprint map (e.g., a map of a special optical power distribution) can be provided to the UE device 130, such as upon or before entry of the region served by the optical transmitter 102.

In another example, the location determination circuit 104 can be included as a portion of the UE device 130, and the UE device 130 can use information obtained from the optical transmitter 102 (such as orthogonally-coded intensity-modulated optical emissions), along with the fingerprint map, to provide an estimated position or other localization information. The receiver circuit 110 can include a wireless receiver configured to obtain information indicative of the measured characteristic from the UE device 130. In another example, the receiver circuit 110 can include a receive signal chain coupled to an imaging sensor or photodetector included as a portion of the UE device 130, such as including an analog-to-digital converter circuit to provide a time-series or other sampled information indicative of a power or intensity of a received optical signal.

The optical transmitter 102 can include a signal source and drive circuitry such as to drive optical outputs, such as light emitting diodes (LEDs). The LEDs can be included as a portion of a luminaire 112A or other transmitter assembly. A single optical transmitter 102 can drive LEDs in a single luminaire 112A or multiple luminaires 112A, 112B, etc. The optical transmitter 102 can be included as a portion of a transmitter assembly comprising the luminaire 112A, or the optical transmitter 102 can be separate such as providing outputs coupled to the luminaire 112A. The location determination circuit 104 can be communicatively coupled to the receiver circuit 110 and the optical transmitter 102, or one or more other portions of the system 102. According to various examples herein, the location determination circuit 104 can provide localization information, such as using a technique as shown illustratively in FIG. 2 or other examples herein.

For example, the location determination circuit 104 can include a processor circuit 106, such as coupled to a memory circuit 108. The memory circuit 108 can include instructions that, when executed by the processor circuit 106, cause the location determination circuit to use information obtained from the receiver circuit to provide localization information to another portion of the system 100. For example, a UE device 130 can include a sensor 122, such as a photodetector (PD) or imaging sensor.

A measured characteristic of light emitted from an optical emitter (e.g., an LED in a luminaire 112B) can be provided by the UE device 130 to the receiver circuit 110, such as using an optical channel or a non-optical channel. In response, the location determination circuit can provide localization information back to the UE device or to another device, such as a non-optical wireless communication node 120A, for use by other portions of the system 100 or for use by other services (such as cloud-based or web-based services that can be accessed by the UE device 130). In an example, localization information can be obtained by the UE device 130 such as trilateration information from multiple non-optical wireless communication nodes 120A or 120B, such as to assist in generating a fingerprint map or other information indicative of the optical power distribution from optical energy emitted by the optical transmitter 102 in a region served by the optical transmitter, as described elsewhere herein.

Figure 2:
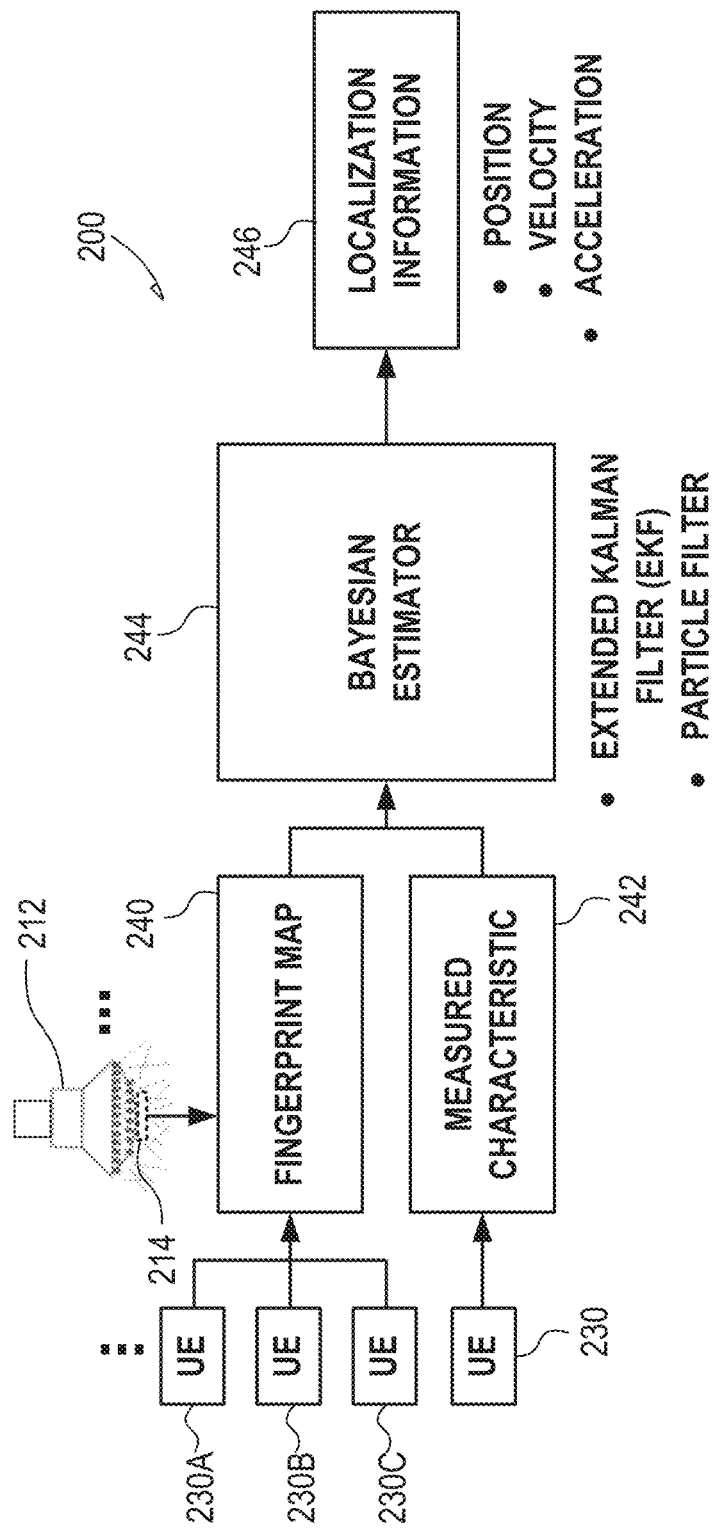
FIG. 2 illustrates generally an example, such as a flow diagram for a technique that can include using a fingerprint map (e.g., representing a scene), along with received information indicative of a measured characteristic provided by a UE device (e.g., a received optical signal strength), to provide localization information, using a Bayesian estimator.

FIG. 2 illustrates generally an example 200, such as a flow diagram for a technique that can include using a fingerprint map (e.g., representing a scene), along with received information indicative of a measured characteristic provided by a UE device (e.g., a received optical signal strength), to provide localization information, using a Bayesian estimator. At 240, a fingerprint map can be received or generated, such as representing an optical power distribution over a region served by optical emitters (e.g., such emitters included as a portion of a luminaire 212) coupled to an optical transmitter in a visible light communication (VLC) system. According to various examples described in this document, the fingerprint map can be generated using information obtained from a sensor included as a portion of one or more luminaires (e.g., using an imaging sensor 214 included as a portion of a luminaire 212), or using other information.

For example, the fingerprint map can be obtained from one or more UE devices 230A, 230B, or 230C, in a "crowd-sourced" manner, or using information from a single UE device 230 as the UE device spatially traverses a region (e.g., a room) served by the optical emitters. Once the fingerprint map is obtained, a targeted UE device 230 can provide a measured characteristic at 242. Such a measured characteristic can include a received signal strength value, or other information corresponding to an optical power received using a sensor included as a portion of the UE device 230. At 244, a Bayesian estimator, such as implementing an extended Kalman filter (EKF) or particle filter (PF) can be used to provide localization information at 246. The localization information can include one or more of a spatial (e.g., (x,y)-value pair) position estimate of the UE device 230 or other information such as a velocity or acceleration estimate, such as to aid in localizing or tracking the UE device 230 within the area served. Unlike other approaches, the present inventors have implemented a technique wherein a Bayesian estimator can use the measured characteristic from the UE device 230 directly, such as without requiring conversion of such input into a spatial representation of the measured characteristic.

Figure 3:
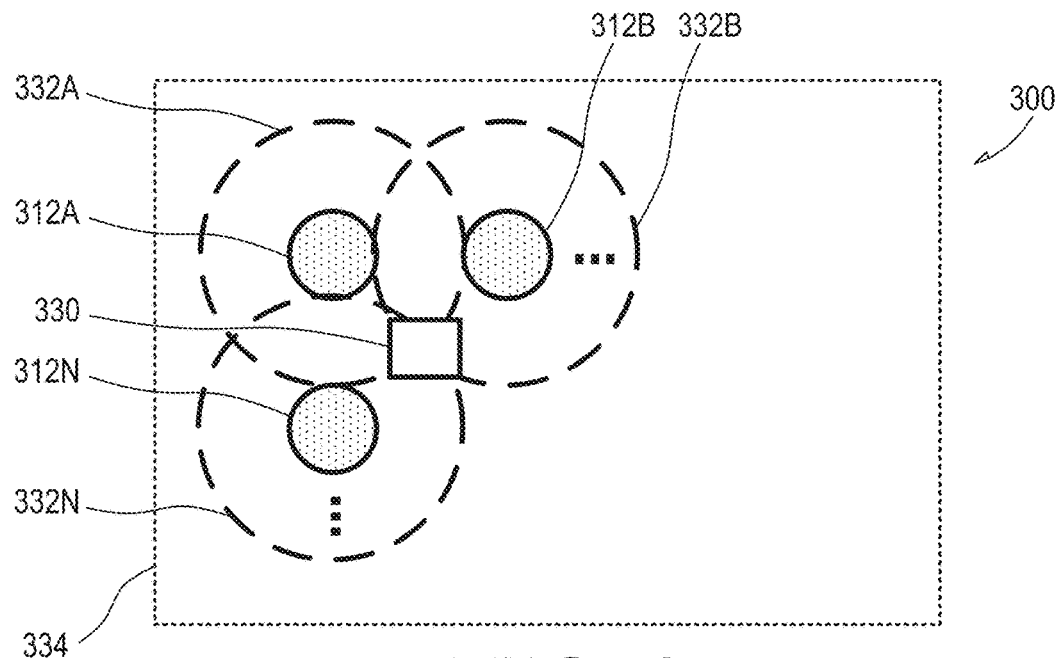
FIG. 3 illustrates generally an example, such as can include a region (e.g., an indoor space) served by one or more optical transmitter assemblies.

FIG. 3 illustrates generally an example, such as can include a region 334 (e.g., an indoor space) served by one or more optical transmitter assemblies 312A, 312B, through 312N. Fields of view 332A, 332B, through 332N, from the optical transmitter assemblies 312A, 312B, through 312N may overlap at a target location (e.g., corresponding to a user equipment (UE) device 330). Depending on conditions within the region 334, obstacles or shadows may impact the optical signals received at the UE device 330 location. Other factors such as ambient light from other sources, shadowing, or diffuse emission from the transmitter assemblies 312A, 312B, through 312N may cause variations in signal-to-noise ratio or other characteristics of the optical signals received by the UE device 330. Apparatus and techniques described in this document can be used to compensate for obstacles, non-line-of-sight (NLOS) receive conditions, and diffuse sources, according to various examples.

Figure 4A:
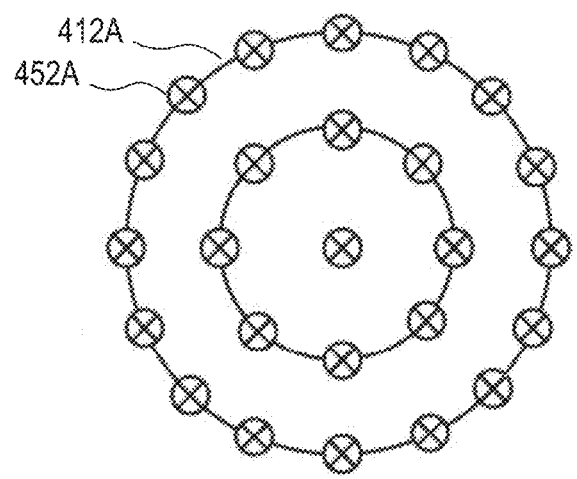
FIG. 4A illustrates generally an illustrative example of a 25-element lamp arrangement, such as can be used to provide the simulated results shown and described herein according to various examples.

FIG. 4A illustrates generally an illustrative example 412A of a 25-element lamp 452A arrangement, such as can be used to provide the simulated results shown and described herein according to various examples. In this illustrative example, the lamps can include LEDs located in three layers, with 1, 8, and 16 LEDs, respectively. For various illustrative example described below, random irradiance angles (e.g., to provide a diffuse-source model), can provide a corresponding optical power distribution within a room or other region.

Figure 4B:
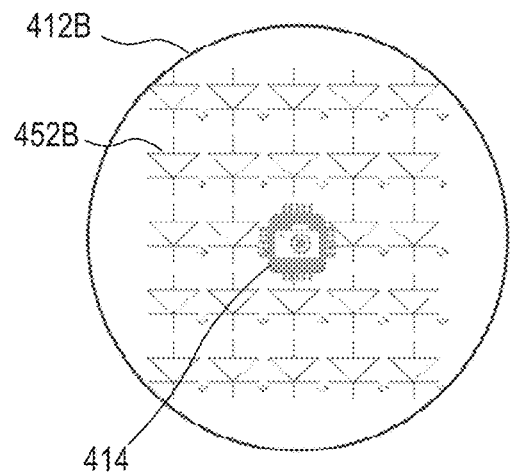
FIG. 4B illustrates generally an illustrative example of a lamp arrangement, such as can be used to provide the simulated results shown and described herein according to various examples, where the arrangement includes an imaging sensor.

FIG. 4B illustrates generally an illustrative example 412B of a lamp 452B arrangement, such as can be used to provide the simulated results shown and described herein according to various examples, where the arrangement includes an imaging sensor 414. Such an imaging sensor 414 can be used to update a fingerprint map or other scene information indicative of an optical power distribution in a room or other region illuminated by the example 412B.

Location Tracking Using Diffuse or Non-Diffuse Optical Emitters

Angulation-lateration tracking approaches generally rely on the assumption of known angles between the transmitter and receiver. In practice, such assumptions may not hold. A diffuser, a chandelier, for example, can cause light from individual lamps to refract through prisms, such as resulting in a non-uniform power distribution in a room. The output rays of light through such prisms have random irradiance angles that make it difficult to use angulation-lateration. The lamp model shown illustratively in the example 412A of FIG. 4A can be used to model the performance of a localization technique that uses a combination of received signal strength (RSS) from a UE device and an extended Kalman filter (EKF), along with a representation (e.g., a fingerprint map) of an expected power throughout a space.

A VLC system can include LED-based luminaires, such as located on the ceiling, that act as optical transmitter assemblies, and a LIE device acting as a mobile optical receiver. The UE device might include one or more of a mobile telephone, a tablet device, a wearable device such as a wrist-worn "smart" watch, a laptop or mobile computer, or other devices such as a hand-held inventory management scanner, for example. Visible light from LEDs is generally incoherent, so intensity modulation and direct detection are generally used in VLC systems. To simplify the analysis, line-of-sight (LOS) components are taken into account for a channel DC gain, which can be defined as, $$H_{LOS} = \begin{cases} \frac{A_r(m+1)}{2\pi d^2}\cos^m(\phi)\cos(\psi), & -\Psi_c \geq \psi \geq \Psi_c, \\ 0, & \text{otherwise}, \end{cases} \quad \text{EQN. 1}$$

where $A_r$ represents an area of the receiver and d represents a distance between the transmitter and the receiver; m represents a Lambertian mode of the transmitted beam, $\varphi$ represents a radiation angle for the transmitter, $\psi$ represents an incident angle at the photodetector (PD) included as a portion of the UE device, and $\psi_c$ is a field-of-view of the PD.

The received power can be represented as, $$P_r H_{LOS} \times P_t \quad \text{EQN. 2}$$

where $P_t$ is the total transmitted power from an LED on a luminaire. Optical signals emitted from a respective lamp assembly or LED can be encoded with an orthogonal code so that the received power from each lamp or LED can be determined by correlating with each code before computing an RSS value.

According to various illustrative examples, power distributions were modeled for the lamp configuration show illustratively in FIG. 4A, for a room The room size is 5×5×3 m³, with four LED luminaires on the ceiling, positioned at (x, y, z)=(1.25, 1.25, 3), (1.25, 3.75, 3), (3.75, 1.25, 3) and (3.75, 3.75, 3). A transmitted power from each LED is 20 milliwatts (mW), yielding a total transmitted power of 500 mW per lamp assembly. Random irradiance angles of the diffusing model generally exhibit a normal distribution with zero mean and a standard deviation of 30°. The refraction of light through the diffuser results in a non-uniform power distribution in the room. According to simulated results, a radiation pattern emitted by the 25-LED lamp model is practically identical to an equally bright single LEI) for 60° half-angle emitters.

An expected average power map can be used as the RSS fingerprint map in the Kalman filter implementation. For example, a receiving plane the floor of the room or a plane displaced from the floor) can be divided into equal size sections using a rectangular grid for the power distribution determination. A received power from each lamp at the each grid point can be determined as the average of the expected power over the area of that rectangular portion of the floor. These expected power levels are placed in a matrix, P, and sent to the UE device as the device enters the room or such a matrix can otherwise used by VLC infrastructure to perform localization of the UE device. With a diffusing lamp model, irradiance angles are generally random and can also be time varying. For example, if the luminaire is a chandelier, random movement of the crystals (prisms) can cause changes in the power distribution map. In one approach, the power map in the room can be found by averaging power distributions that are captured such as at specified time intervals. The power map update frequency can depend on factors such as air flow in the room and the interference of light with moving people.

A signal to noise ratio (SNR) analysis can be modeled where the main noise sources in a visible light communication (VLC) system are shot and thermal noise. Shot noise generally depends on the background light and the transmitted power from the light sources, and thermal noise generally results from the optical receiver electronics. As an illustrative example, an indoor illumination level of 400 lumen can result in an SNR=50 dB for a bandwidth of 640 kilohertz (KHz) for indirect sunlight exposure. Other uncertainties can act like noise, including errors in the power estimation shadowing of the line-of-sight between the transmitter and the receiver, other objects in the room, uneven dimming of the lamps, or the inclination angle of the UE device, as illustrative examples. These effects may degrade the SNR, and therefore, thermal and shot noises alone may not adequately model the uncertainties in the system. A third noise term, (e.g., "uncertainty" noise) can be added to account for the factors mentioned above. Hence, SNR, can be modeled as, $$\frac{R^2 P_R^2}{\sigma_{shot}^2 + \sigma_{thermal}^2 + \sigma_{uncertainty}^2} \qquad \text{EQN. 3}$$

The term R can represent the receiver responsivity, $P_R$ can represent a received power at a photodetector, and the $\sigma_{shot}^2 + \sigma_{thermal}^2 + \sigma_{uncertainty}^2$ terms can represent the variance of the shot, thermal, and "uncertainty" noise, respectively. When the optical power is low, an "uncertainty" noise can be dominant in the system because there are estimation errors in the power map generation or collection. For comparatively higher optical power, the estimation error can be small, therefore thermal and shot noise can dominate. An EKF tracking approach can include state estimation using an extended Kalman filter (EKF) using the received power levels, such as in the aggregate from multiple lamps, as the measurement provided by a LT device. Given a discrete time state space system, the dynamical system evolves according to:

$$x_k = f(x_{k-1}) + q_{k-1} \qquad \text{EQN. 4}$$

$$y_k = h(x_k) + r_k \qquad \text{EQN. 5}$$

where $x_k \in \mathbb{R}^n$ represents the state vector, $y_k \in \mathbb{R}^m$ represents the measurement vector, the process noise is $q_k \sim N(0, Q_k)$ (e.g., a zero mean, Gaussian distributed noise with covariance $Q_k$), and $r_k \sim N(0, R_k)$ can represent the measurement noise with covariance $R_k$. $f(\bullet)$ can represent a dynamic model function and $h(\bullet)$ can represent a measurement model function. A piecewise-constant white acceleration model can be used accurate representation of UE device (e.g., mobile user motion.

The state is $x = [x, y, \dot{x}, \dot{y}]^T$, where the Cartesian coordinates are aligned with the walls of the room and the position of the UE device is represented by x and y, and $\dot{x}$ and $\dot{y}$ represent velocity components. Known reference locations can be used for finding the initial states in a room such as corresponding to doors, windows, or lighting fixtures. A selection of an initial error covariance matrix corresponds to the error introduced from the initialization. The VLC channel gain equation mentioned above is generally a nonlinear function, and as a result, the measurement vector y, which is a vector of received power strengths from the luminaires, is generally a nonlinear function of the state.

Use of an EKF approach includes linearization of nonlinear functions. A derivative of the channel gain is difficult to evaluate without exact emitted angle information. The use of an EKF involves an evaluation of a Jacobian, $H(\bullet)$ of $h(\bullet)$.

Figure 5:
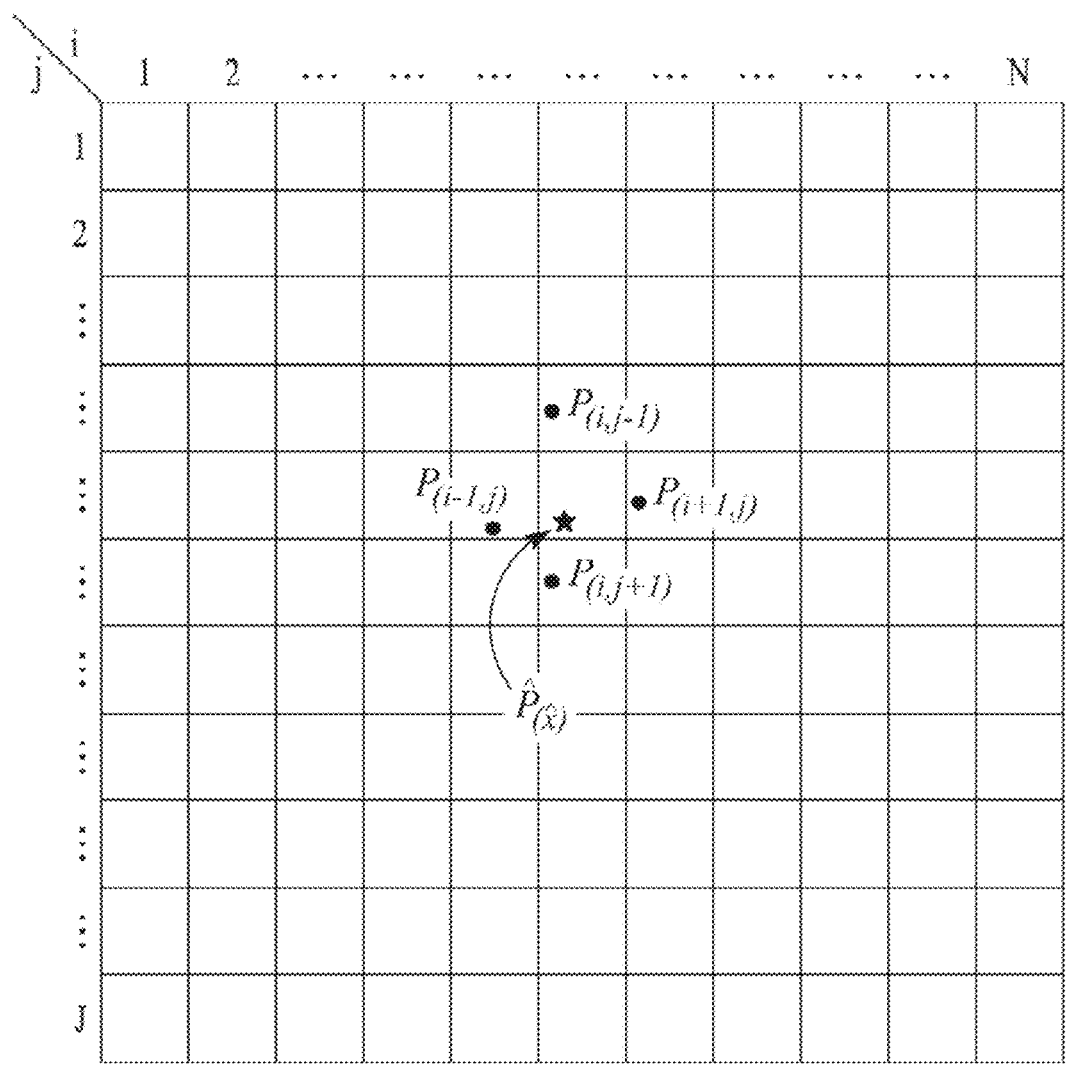
FIG. 5 illustrates generally an illustrative example of a power distribution map or matrix, such as corresponding to a room or other region served by one or more optical transmitters in a VLC system.

The present inventors have recognized, among other things, that a finite difference technique can be used for linearization. If a physical area of the room is divided into N×J squares, as shown illustratively in FIG. 5, then an average power received in the grid square(i, j) can be denoted as $P_{(i,j)}$, where i=1, . . . , N and j=1, . . . , J are the indices in the x and y directions. FIG. 5 illustrates generally a power distribution matrix such as can be represented as P. In FIG. 5, a predicted position from the previous iteration of the EKF is denoted by the symbol ★. A power at this location in the grid can be represented as a predicted power, $\hat{P}(\hat{x})$ and such a power can be used in the EKF update equation. A Jacobian used for the Kalman gain can be approximated as, $$H(x) \approx \left[ \frac{P_{(i+1,j)} - P_{(i-1,j)}}{2\Delta x} \frac{P_{(i,j+1)} - P_{(i,j-1)}}{2\Delta y} \right] \qquad \text{EQN. 6}$$

where i and j represent indices of the power of a predicted state vector and $\Delta x$ represents a granularity of the power map. A performance metric that can be used to evaluate the EKF technique is the root mean square error (RMSE) between an estimated and a true UE device position. Light dimming or other uncertainties can be modeled as different SNR levels. For various illustrative examples; a size the modeled room can be 5×5×3 m³ and $\Delta x$ can be set to 1 centimeter (cm). Modeled velocities of the mobile user are 0.1 m/sec in the x direction and 0.3 m/sec in they direction. Positions of the luminaires and the transmitted power can be the same as mentioned above in relation to the fingerprint map generation (e.g., four luminaires emitting 500 mW each). The receiver can be assumed to be moving on the room floor for purposes of the illustrations mentioned here.

Figure 6:
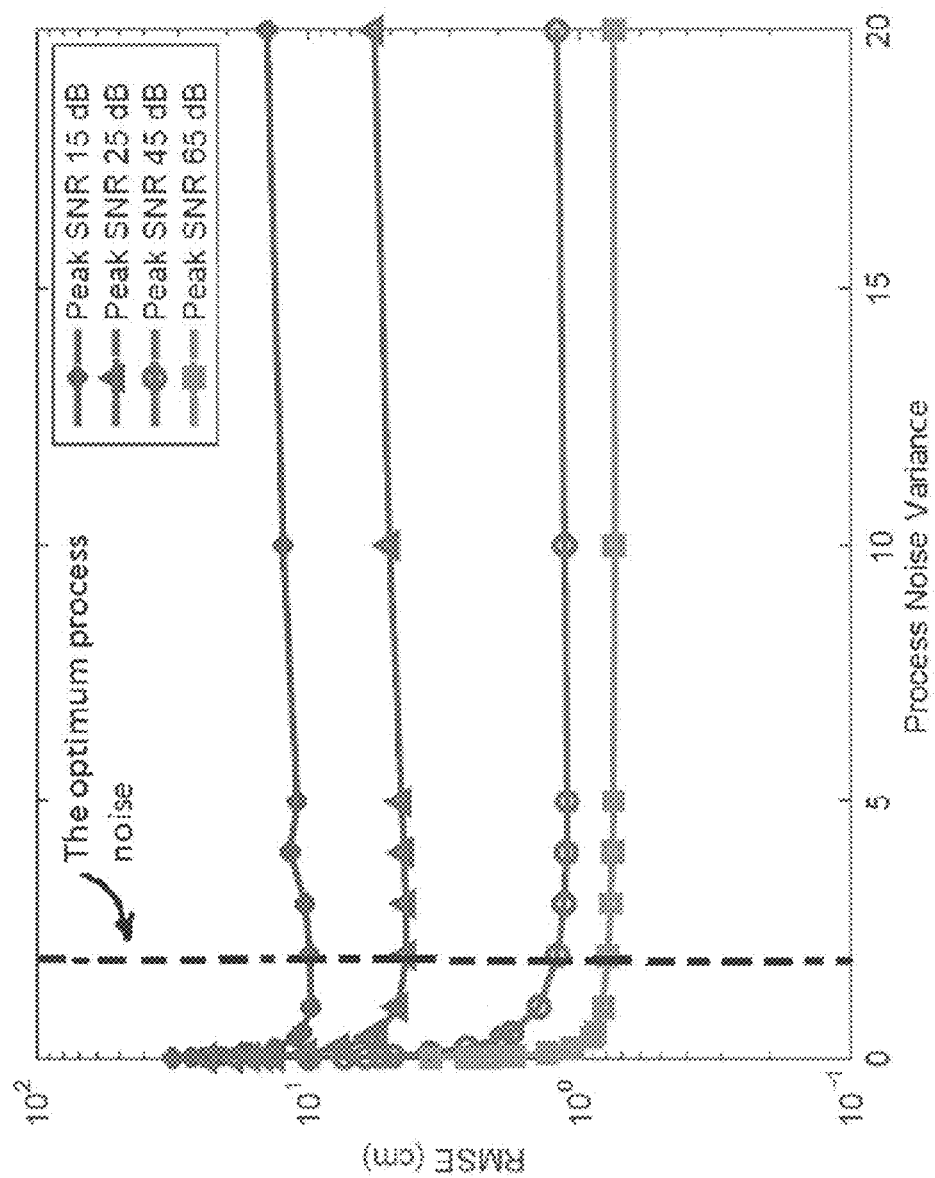
FIG. 6 illustrates generally a simulated process noise variance for various illustrative examples of an EKF implementation.

Success of an EKF-based technique can depend in part on a dynamic model and a process-noise-level selected $Q_k$. An effect of a variance of the process noise on the positioning error is shown in FIG. 6, which illustrates generally a simulated process noise variance for various illustrative examples of an EKF implementation. Generally, for the illustrations in this section, a mobile user is modeled as following an S-shaped trajectory. The same process noise levels in the EKF implementation are simulated for different SNR levels, and the process noise that yields the minimum RMSE was used for other simulations. According to various simulations, the process noise is kept the same as mentioned above and a peak SNR is varied. Results of such simulation illustrate generally tracking results do not deviate from the true trajectory significantly until the SNR falls below about 25 dB. Tracking results when the diffuse model is used show that the tracking errors are worse due to the random diffusion angles. When the diffuse model is used, a positioning error for a constant velocity target is higher than for the S-shaped motion; this is believed due to straight motion being subject to lower average SNR because it is more often further from the LEDs in the model.

Figure 7A:
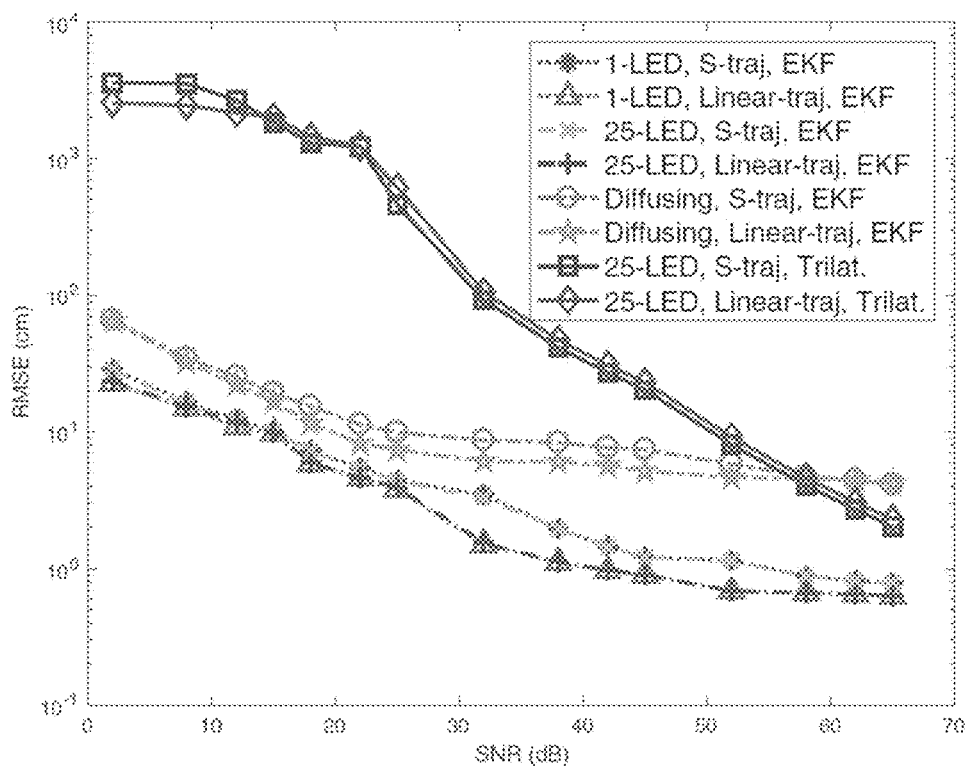
FIG. 7A and FIG. 7B illustrate generally a simulated comparison between an illustrative example of an EKF implementation as compared to an optical trilateration approach for location determination of a UE device.
Figure 7B:
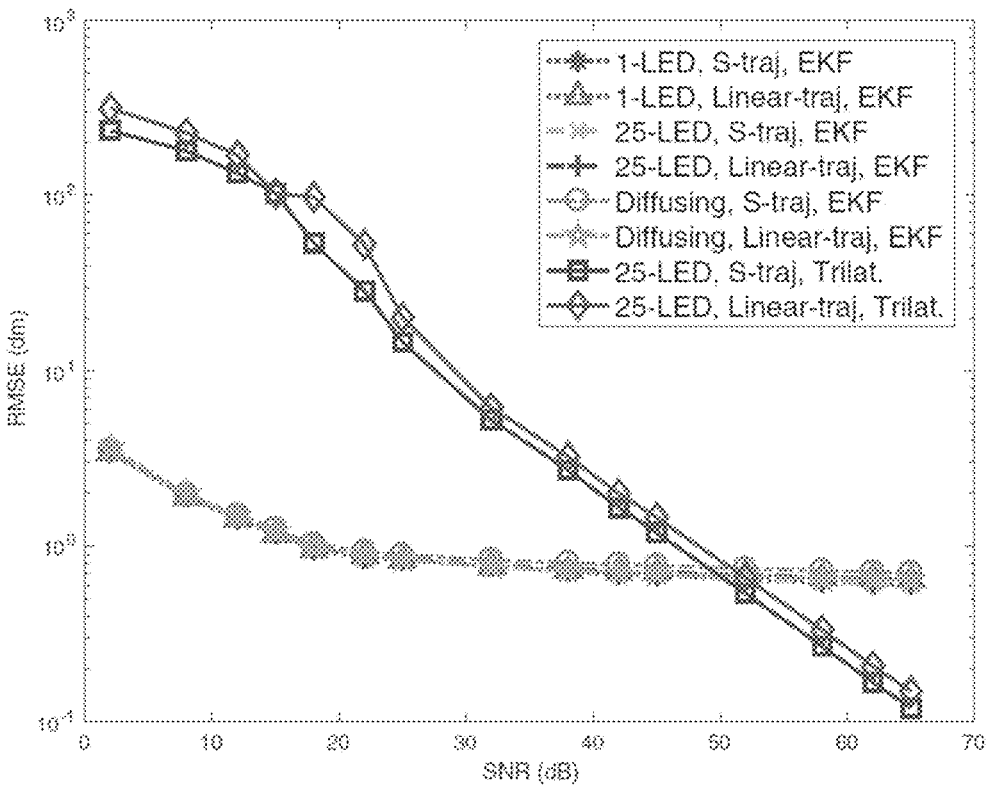

FIGS. 7A and 7B illustrate generally a comparison between an illustrative example of an EKF implementation as compared to an optical trilateration approach for location determination of a UE device. An EKF-based technique generally performs better under low SNRs than a trilateration-based approach. For example, a performance of a deterministic 25-LED lamp using EKF and trilateration can be compared, but a comparison for the diffusing lamp cannot be generated because the random inclination angles of the LEDs are unknown, precluding simulation of optical trilateration. The irradiance and incidence angles are required for simulation of the trilateration approach. Performance of a single LED lamp is compared with the 25-LED lamp. The results illustrate generally that when the LED semi-angle is large, the tracking performance is close, because the power map of the 25-LED lamp and single LED lamp are generally similar. In FIG. 7A, the grid area resolution is 1 centimeter-squared. In FIG. 7B, the grid area resolution is 1 decimeter-squared.

Location Tracking Non-Line-of-Sight (NLOS) or in the Presence of Shadowing

Triangulation-based algorithms like TOA, AOA, and RSS generally assume line-of-sight (LOS) between light sources and receivers for accurate position determination. Such LOS operation is generally not present universally in real life scenarios due to obstruction in LOS or varying signal-to-noise ratio (SNR).

As mentioned above, a fingerprint map can be used for position estimation, such as determined in an "offline" manner or prior to position estimation. Such a prior-determined fingerprint map, P, can serve as an initial map sent to a UE device upon entering a space served by the VLC, such as a room. The UE device can obtain a measured characteristic such as RSS values, (y) in an "online" manner from optical emitters (e.g., lamps) as the UE device moves in the room, such as using a single photodetector or an imaging sensor. P can be used as a look-up table for the power received in the predicted position, and y can be used as a real-time measurement for Bayesian filtering. The performances of two Bayesian filters, the EKF and PF, are compared with an optical-based trilateration technique in the illustrative examples in this section.

Simulation results herein show that variations in the SNR of a particular lamp do not affect the accuracy dramatically, unlike for trilateration. A channel model, $H_{LOS}$, can be defined as in EQN. 1, above. A differential NLOS DC gain of the first bounce, (e.g., a gain resulting from a differential surface area dA), can be represented as, $$dH_{NLOS} = \qquad \text{EQN. 7}$$

Figure 8A:
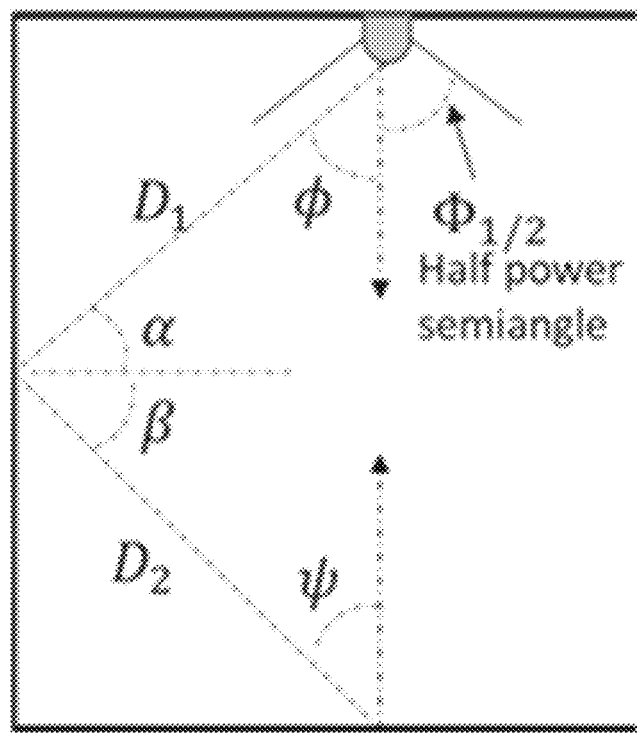
FIG. 8A illustrates generally an example of a geometrical model of line-of-sight (LOS) and non-line-of-sight (NLOS) propagation from a transmitter to an optical receiver location.
Figure 8B:
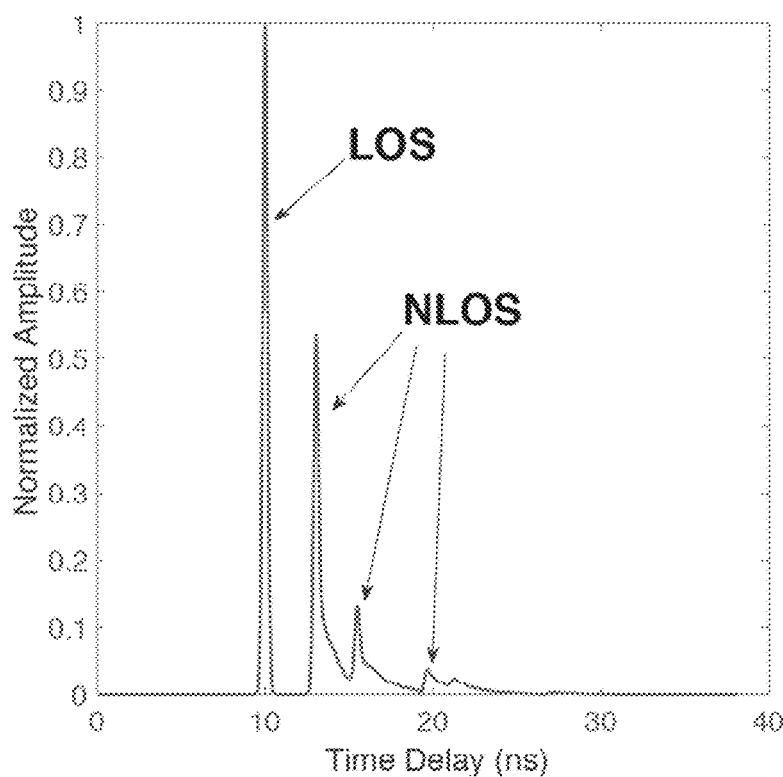
FIG. 8B illustrates generally an example of a simulated impulse response of an optical channel including LOS and NLOS components.

-continued
$$\begin{cases} \frac{A_r(m+1)}{2\pi^2 d_1^2 d_2^2} \rho \cos^m(\phi)\cos(\alpha)\cos(\beta)\cos(\psi)\, dA, & 0 \le \psi \le \Psi_c, \\ 0, & \text{otherwise,} \end{cases}$$

where $d_1$ represents a distance between the LED and a reflection point, $d_2$ represents a distance between the reflection point and the receiver, $\rho$ represents a reflectance coefficient, $\varphi$ represents an angle of irradiance from the LED, $\alpha$ represents an angle of incidence of the reflective point, $\beta$ represents an angle of irradiance to the receiver, and $\psi$ represents an angle of incidence at the photodetector. The symbols defined above are shown illustratively in FIG. 8A, which illustrates generally an example of a geometrical model of line-of-sight (LOS) and non-line-of-sight (NLOS) propagation from a transmitter to an optical receiver location, and FIG. 8B illustrates generally an example of a simulated impulse response of an optical channel including LOS and NLOS components. A power value $P_t$ can represent a transmitted total power from each LED lamp. For each lamp, the received optical power $P_r$ from the LOS and NLOS components can be defined as, $$P_r = P_t H_{LOS} + \int_{walls} P_t dH_{NLOS}. \qquad \text{EQN. 8}$$

As mentioned in relation to FIG. 5, a power map, P, for a room can be found by averaging power distributions that are captured such as at specified time intervals. Position tracking in the presence of NLOS signal components can be performed using an EKF or particle filter (PF) implementation. An EKF may suffer as a state estimator when dynamic models are nonlinear or noise is non-Gaussian. A PF implementation can be used with a system that has multi-modal noise or discrete state components, and a PF implementation does not require a linearization. PF generally involves a numerical method, whereas EKF may generally be derived from an underlying analytical method. As in the examples above, a goal of a tracking algorithm can be to estimate a state of a UE device, at each time step k, which can be given as $x_k = [x, y, \dot{x}, \dot{y}]^T$. A dynamic model can be defined generally as $$x_k = Ax_{k-1} + q_{k-1} \qquad \text{EQN. 9}$$

$$y_k = h(x_k) = r_k \qquad \text{EQN. 10}$$

where A represents a state transition matrix and $x_k$ represents a hidden state at time k, and EQN. 10 is similar in definition to EQN. 5, above. A Jacobian used for updated the EKF technique for the examples herein can be similar to EQN. 6, such as having a granularity of the grid defined by $(\Delta x, \Delta y)$:

$$H(x) \approx \left[ \frac{P_{(i+1,j)} - P_{(i-1,j)}}{2\Delta x} \quad \frac{P_{(i,j-1)} - P_{(i,j-1)}}{2\Delta y} \right]. \qquad \text{EQN. 11}$$

The EKF technique of the illustrative examples in this section can be implemented in a manner similar to the examples of the prior section, such as for comparison with a PF-based technique. A PF technique can also include use of a fingerprint map, P, but does not involve a linearization step. The PF uses an initial distribution of particles, $x_0^{(i)} \sim p(x_0)$, where superscript (i) represents a particle number, and $p(x_0)$ represents an initial probability density function of particles. Each particle has an associated weight.

The weights are equal initially, and can be denoted by $\omega_0^{(i)}$. A dynamic model can then be used to propagate the particles. The PF calculates the likelihood of the particle weights $\omega_k^{(i)}$ by looking up a predicted power $P(\hat{x}_k^{(i)})$ on the predicted positions of the particles derived from the fingerprint map, along with using real-time power measurements $y_k$, from the UE device. At time k, such likelihoods can be calculated as $\tilde{w}_k^{(i)} = p(y_k | y_k^{(i)})$, where p(•|•) represents a conditional probability function, $y_k$ represents a received power as measured by the UE device, and $\hat{y}_k^{(i)} = P(\hat{x}_k^{(i)})$ represents the predicted power vector on the predicted particle position. Because the position is cannot be observed directly, so a received optical power at the UE location is observed. In the PF approach, the particle positions, $\hat{x}_k^{(i)}$, can be predicted using a dynamic model, and then the corresponding power level can be obtained from P. Likelihoods can be normalized using the following, $$w_k^{(i)} = \frac{\tilde{w}_k^{(i)}}{\sum_{k=1}^{N} \tilde{w}_k^{(i)}}. \quad \text{EQN. 12}$$

After the operations above are performed, resampling can be performed, where new particles are drawn based on a posterior probability distribution function obtained after normalization. A stratified resampling approach can be used, such as where the smaller weights are sampled at most once and the higher weights are sampled at least once. A mean or other central tendency of the particle positions can then be used as a position estimate. The PF technique can include use of an initial proposed distribution that functions like an initialization, thus an initial guess of the state and an initial error covariance are not required for PF.

As in other examples, a root mean square error (RMSE) of the position estimates can be used to evaluate different techniques. Table I, below, provides simulation parameters used for the illustrative examples simulated in this section. The room is assumed to be empty. The sampling frequency of the photodetector on the UE device is 100 Hz. Two different fingerprint map resolutions are simulated: $\Delta x = \Delta y = 1$ decimeter (dm) and 1 centimeter (cm). The RMSE results are the mean of the RMSE from 100 random trajectories and 95% confidence intervals are also calculated. The UE device is assumed to be moving at a fixed height and the UE orientation is fixed. For trilateration simulation, positions of the LED lamps are known. The optical power meets the requirements set by the Illuminating Engineering Society of North America (IESNA). Bayesian filters generally depend on the selection of dynamic model and knowledge of noise characteristics. The dynamic model is selected to mimic human walk following an S-shaped trajectory at a sampling interval of 10 milliseconds, which agrees with a constant velocity model. A process noise variance can be chosen to be optimal for the EKF and the PF (e.g., a level that minimizes the RMSE for each algorithm in the simulation). The same process noise level is simulated at different SNR levels. Generally, a computation time of the PF is proportional to the number of particles used. 500 particles were found to be optimal by trial and error for simulated examples herein. The EKF implementation is provided with initial information of the states. Predefined anchor points, such as doors or windows, can be used for estimating the initial state in the room. The selection of an initial error covariance matrix is the error introduced due to the initialization.

Figure 9A:
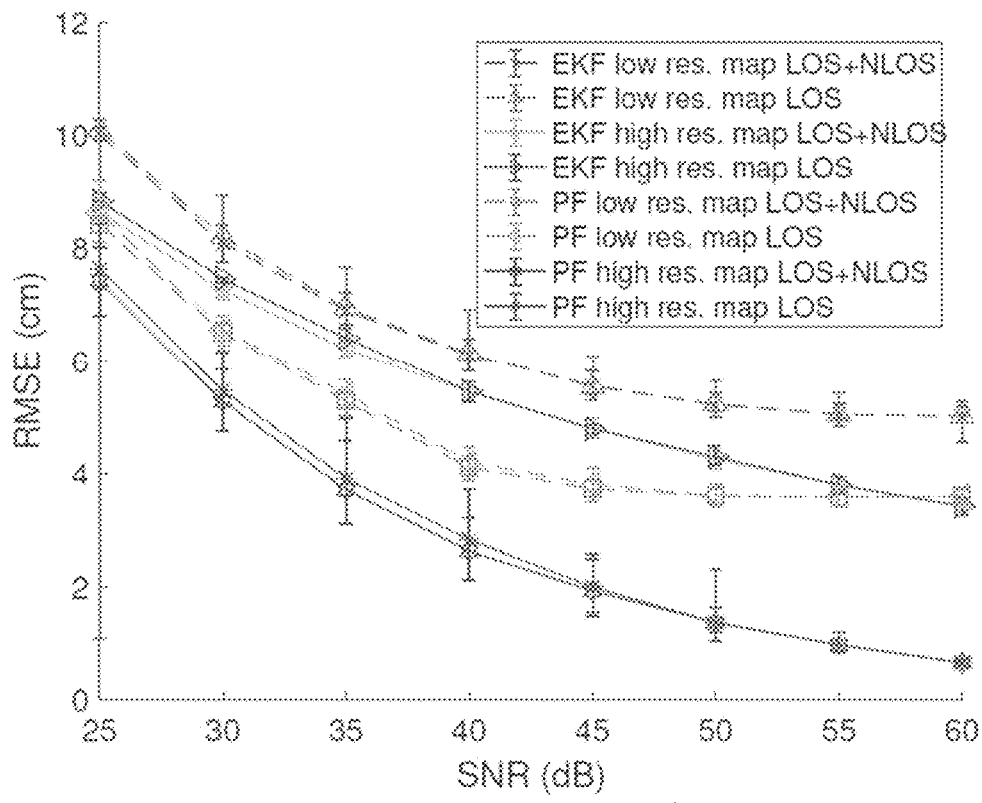
FIG. 9A illustrates generally a simulated comparison between illustrative examples of EKF and PF implementations for two different fingerprint map resolutions, and for fingerprint maps generated including NLOS and LOS contributions, versus LOS-only contribution, using unbiased maps.
Figure 9B:
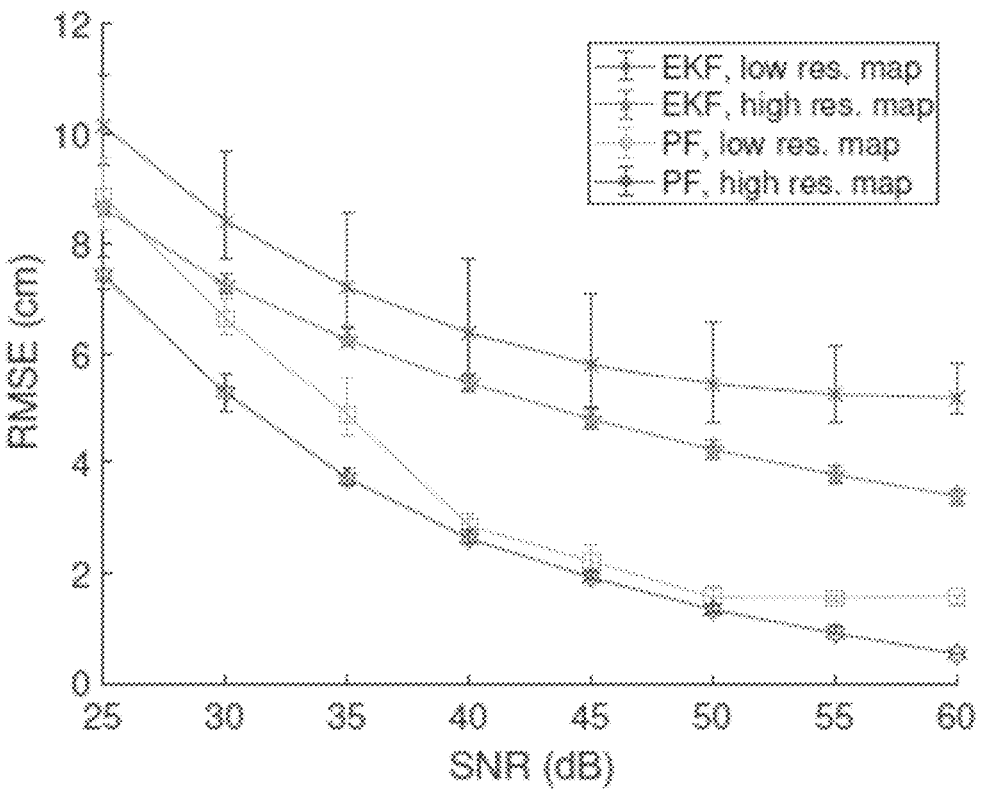
FIG. 9B illustrates generally a simulated comparison between illustrative examples of EKF and PF implementations for two different fingerprint map resolutions where RMSE is evaluated between the nearest tracking grid point and the nearest true trajectory grid point.

In an unbiased example, a fingerprint map provided as an input correctly represents an expected power level from each lamp, (e.g., there is no unknown shadowing in the system as modeled). FIG. 9A illustrates generally a comparison between illustrative examples of EKF and PF implementations for two different fingerprint map resolutions, and for fingerprint maps generated including NLOS and LOS contributions, versus LOS-only contribution, using unbiased maps. In the example of FIG. 9A, PF outperforms the EKF for both map resolutions and LOS and NLOS conditions. The linearization step in the EKF may sometimes lead to miscalculation and introduce error. The PF does not require a linearization step; instead, it simulates the candidate representations (particles) and looks at the likelihoods between the currently measured power level and the recorded power levels at the positions of the particles. FIG. 9A also illustrates that including the NLOS information in the fingerprint map is not required. To isolate the tracking errors due to noise (without quantization errors due to the power map grid), FIG. 9B illustrates generally a comparison between illustrative examples of EKF and PF implementations for two different fingerprint map resolutions where RMSE is evaluated between the nearest tracking grid point and the nearest true trajectory grid point.

Figure 10:
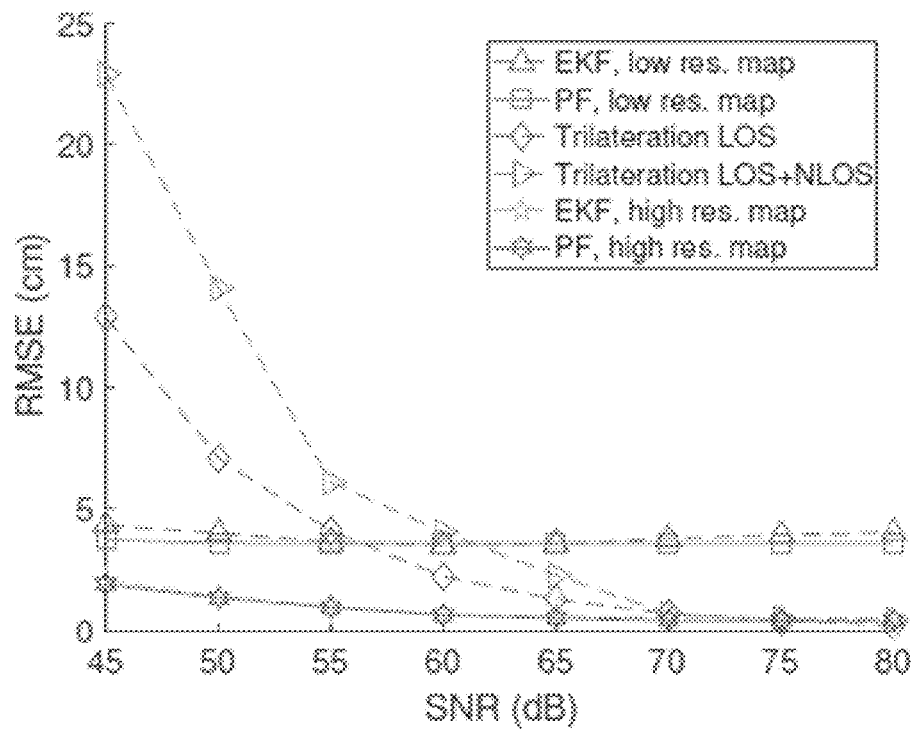
FIG. 10 illustrates generally a simulated comparison between illustrative examples of EKF and PF implementations versus trilateration when the fingerprint maps (LOS and NLOS) have different resolutions for the grid for high SNR values.

FIG. 10 illustrates generally a comparison between illustrative examples of EKF and PF implementations versus trilateration when the fingerprint maps (LOS and NLOS) have different resolutions for the grid for high SNR values. The performance of the trilateration algorithm can be quite sensitive to noise. When solving the trilateration problem, an accurate calculation of the distance between the transmitter and the receiver is generally relied upon. Noise in the system or even slight shadowing increases the error of the trilateration determination. The trilateration technique generally expects all the measured power to come from LOS sources. When the NLOS component is significant, as in the scenario considered in these simulations, the NLOS part of the light will act like additional noise, thus decreasing accuracy of RSS-based optical trilateration.

Figure 11:
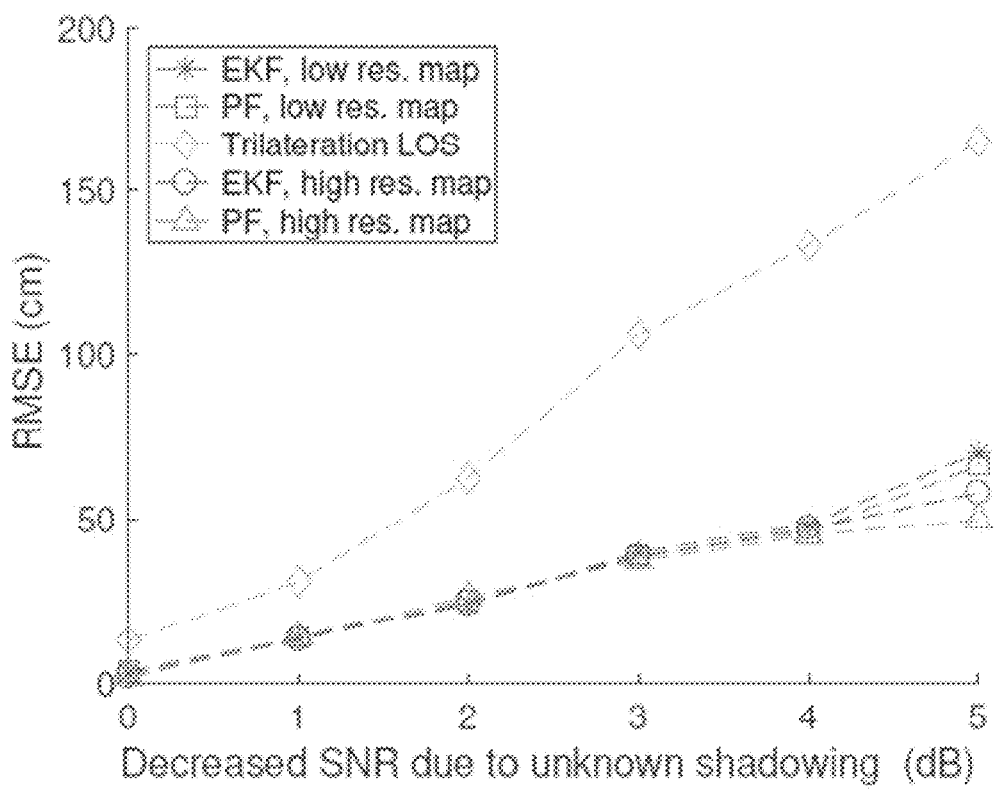
FIG. 11, which illustrates generally a simulated comparison between illustrative examples of EKF and PF implementations versus trilateration when a lamp has an unknown shadowing loss, for SNR=45 dB, and α=0 dB.

Unforeseen shadowing may impact the performance of location determination techniques. In a shadowing example modeled here, the fingerprint map is not updated to account for the shadowing and is therefore unaware that there is a change in the illumination conditions. This shadowing can be regarded as introducing a bias in the fingerprint map. The effect of such bias can be seen in FIG. 11, which illustrates generally a comparison between illustrative examples of EKF and PF implementations versus trilateration when a lamp has an unknown shadowing loss, for SNR=45 dB, $\alpha=0$ dB. Generally, the UE device receives lower power from one of the lamps than what is expected, and this shadowing can be modeled as an additional path loss factor $\alpha$ on one of the four lamps. Generally, as shown in FIG. 11, as the SNR loss increases, the accuracy of the three algorithms (EKF, PF, trilateration) decreases, but the position error of the trilateration increases the most.

TABLE I

Simulation Parameters

| Parameter | Value |
|---|---|
| Room dimension (L × W × H) | 5 × 5 × 3 m³ |
| Transmitted power from each LED lamp ($P_t$) | 20 Watts |
| Lambertian mode (m) | 1 |
| LED lamp elevation and azimuth | −90° and 0° |
| Positions of the 4 LED lamps in the room (x, y, z) (m) | 1.25 m away from the walls, for x and y, and z = 3 m |

TABLE I-continued

Simulation Parameters

| Parameter | Value |
| --- | --- |
| Height of the photodetector | 0.75 m |
| Field of view ($\Psi_c$) | 70° |
| Physical area of the photodetector ($A_r$) | 1 cm |
| Receiver elevation and azimuth | 90° and 0° |
| Gain of optical filter and refractive index of the lens at the photodetector | 1.0 and 1.0 |
| Room reflection coefficient ($\rho$) | 0.8 |

Image-Sourced Fingerprint Generation Technique

A challenge with the fingerprinting-based techniques (e.g., EKF or PF implementations) is to collect the fingerprint measurements, such as received signal strength (RSS) or angle-of-arrival (AOA). The site survey for data collection may generally be a labor intensive, time-consuming, or error-prone process. An automated site-survey technique can be used, such as when an optical transmitter such as a luminaire assembly includes an LED emitter (or an array of such emitters) and an imaging sensor (e.g., a camera). The fingerprint maps obtained using such an automated or semi-automated site survey with embedded imaging sensors can be combined with other techniques described in this document.

The reference or a priori fingerprint map $\tilde{P}$ for a room or other region served by the VLC system can be modeled. The reference fingerprint map can be used for estimating the expected power map, $\hat{P}$, in the room. For example, LED luminaires can be equipped with an imaging sensor as shown illustratively in FIG. 4B. The image sensor included as a portion of the LED can capture images (e.g., intensity-mapped or grayscale images), I, in the room, where i represents an image index or number. A grayscale image from the camera and the modeled $\tilde{P}$ can be used to estimate $\hat{P}$. An optimization can be automated that searches for the best $\hat{P}$ for a particular room, such that once calibration is performed, an accurate $\hat{P}$ can be estimated using $\tilde{P}$ and I. The system can select the best technique to update the $\hat{P}$ such as using a mean-square error (MSE) or other metric. The estimated power map, $\hat{P}$, can be provided to the target or other portions of the system for use as a fingerprint map in performing a localization determination.

Generally, an imaging sensor can be calibrated according to specific room conditions. Various techniques can be used such as one or more of linear and non-linear curve fitting, and artificial neural network (ANN)-based regression. In a linear regression approach, a gamma correction technique can be used. Gamma correction helps to find a linear equation for the curve fitting function. Non-linear regression can be used for finding a higher degree polynomial representation without using the gamma correction technique. ANNs can be used for function fitting and approximation. In an illustrative example, a most up-to-date estimate of the fingerprint map in the room is the average of multiple light intensity distributions that are determined such as at specified time intervals. A newest $\hat{P}$ can replace and older $\hat{P}$ in a recursive manner. An update frequency, can be determined such as using information about interference of the light with users or changes in the SNR level.

Gamma Correction Approach: When grayscale pixel values of a captured image are plotted versus the light intensity levels from $\tilde{P}$, such as in watts (W), a resulting distribution may not be a straight line. A high degree polynomial can be used to find an equation for mapping from the grayscale values to the power levels. A gamma correction technique can be used to find a simple function for estimating a power from an acquired image, a linear function in the form of $y=a_1x+a_0$. The gamma correction changes the luminance values in a still image. The gamma correction helps to obtain a linear grayscale pixel value distribution, such as resulting in histogram stretching. A dynamic range of the grayscale image can be adjusted to a new gamma value. A gamma correction function can be represented as $$\hat{P}=a_1 I'+a_0 \qquad \text{EQN. 13}$$

where $\hat{P}$ represents the expected power map, I represents an image obtained from the camera and $a_1$, $a_0$ represent linear equation coefficients.

In an example, there can be nonlinearities that are not correctable using a gamma correction technique. In such cases, a higher-order polynomial can be used for a regression process; as an illustrative example, the polynomial may be of any order that minimizes the MSE (such as having a form shown below in EQN. 14).

$$\hat{P}=a_m I^n+a_{m-1} I^{n-1}+\ldots+a_1 I^1+a_0 \qquad \text{EQN. 14}$$

In yet another approach, an artificial neural network (ANN) can be used and can represent a series of parallel nonlinear equations. The weights used to update the connections in an ANN can be selected to decrease the MSE. The ANN can be used for curve fitting, including for nonlinear problems. Depending on the size of the power map, the ANN may be faster than the regression methods mentioned above. The ANN used for illustrative examples herein is a shallow network, including a single hidden layer. The input comprises grayscale pixel values, and the output is the power estimate, $\hat{P}$.

Performance of the fitting methods mentioned above was simulated for two different fingerprint map grid resolutions. Such a resolution refers to a length of the side of the grid rectangle ($\Delta x=\Delta y$), similar to other examples in this document. In an operational mode, an image is captured and an estimated functional relation can be used to determine an updated (e.g., current) $\hat{P}$. In practice, such updates can be performed every few minutes or according to some other specified interval. A physical room receiving plane can be divided into equal size N×J grid rectangles.

Figure 12A:
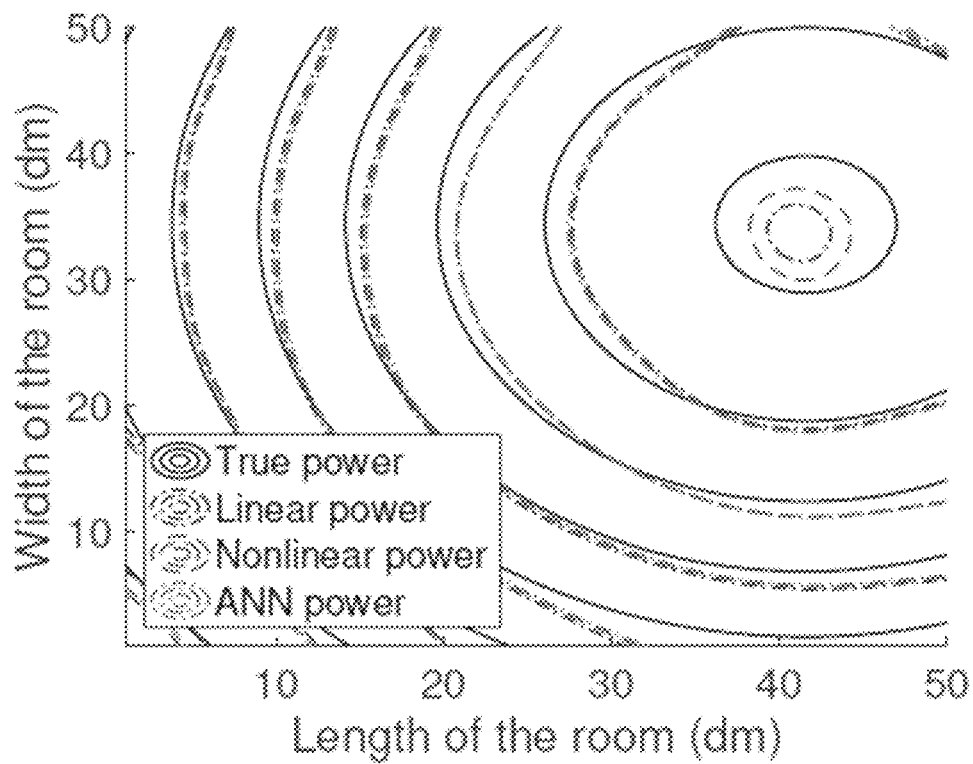
FIG. 12A illustrates generally a simulated comparison of fitting methods that can be used to update a fingerprint map.
Figure 12B:
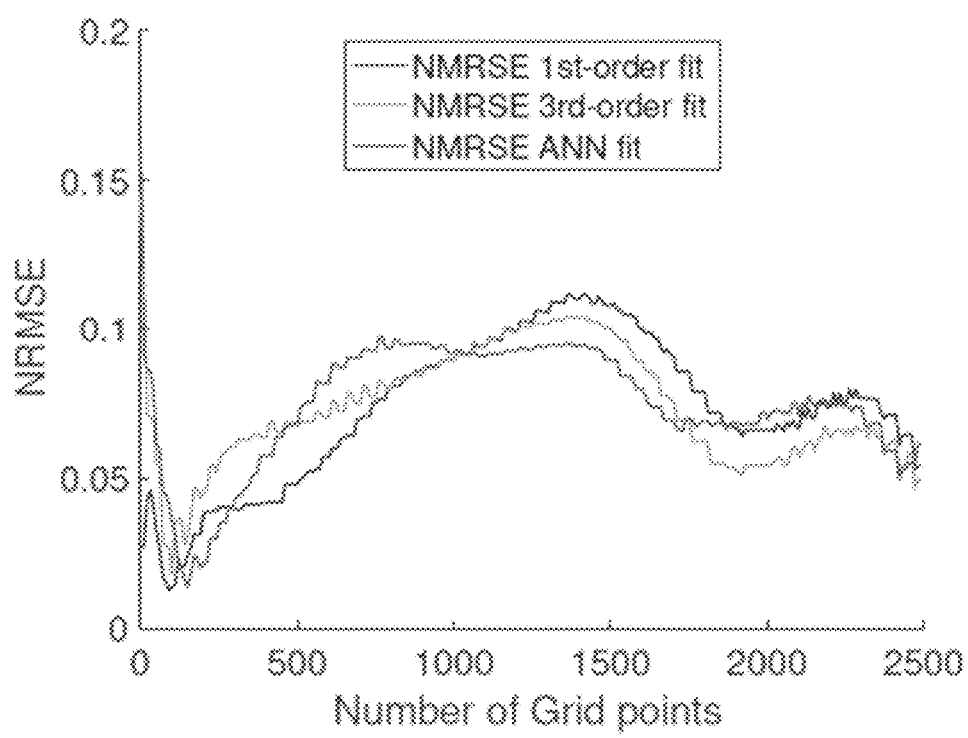
FIG. 12B illustrates generally a normalized root mean square error (NRMSE) between the true power and the estimated power at each grid point in a fingerprint map.

FIG. 12A illustrates generally a simulated comparison of fitting methods that can be used to update a fingerprint map, and shows a bias introduced in each of the estimated maps and FIG. 12B illustrates generally a normalized root mean square error (NRMSE) between the true power and the estimated power at each grid point in a fingerprint map. The bias of FIG. 12A can be induced as a result of calibration error of LEDs, and such bias can affect a position determination directly. The simulated results of FIG. 12A and FIG. 12B show that the performances of the three fitting techniques yields different NRMSE depending on the grid position point.

A position tracking technique can use the estimated map $\hat{P}$ as an input. Simulated results discussed below can be obtained using an EKF tracking technique as described in other examples herein. An RMSE between the "ground truth" and the estimated position is used as a performance metric, as in other examples. The performance of two different fingerprint maps was evaluated in the simulation results below. The first map is a comparatively lower resolution map, ($\Delta x=\Delta y=1$ dm), and the comparatively higher-resolution map is ($\Delta x=\Delta y=1$ cm). The UE device is modeled as following an S-shaped trajectory. A constant velocity model is for the EKF, as in other examples. A position of the UE device target is estimated in a two-dimensional plane, so the target is assumed to be moving at a fixed height. Various simulation parameters are shown below in Table II.

Figure 13:
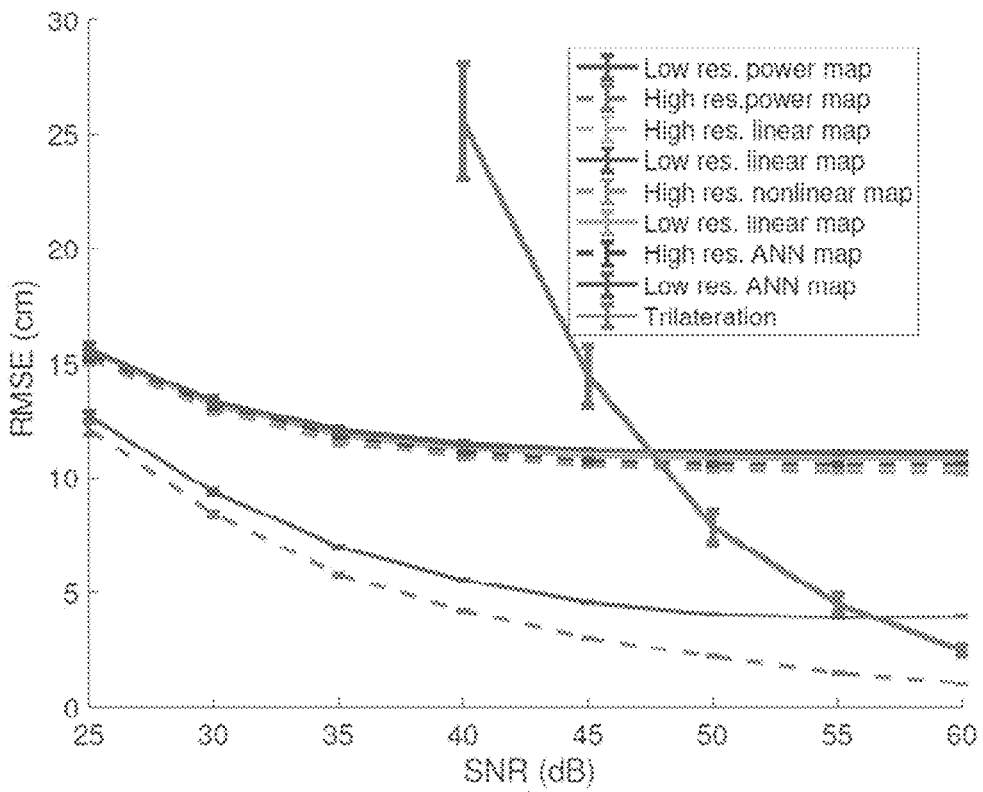
FIG. 13 illustrates generally a simulated comparison between various position tracking approaches using different fingerprint map update techniques and different map resolutions, versus a trilateration-based approach.

FIG. 13 illustrates generally a simulated comparison between various position tracking approaches using different fingerprint map update techniques and different map resolutions, versus a trilateration-based approach. The trilateration-based technique underperforms the other techniques at SNR values below 40 dB. Such results illustrate that when the uncertainty noise dominates (according to the SNR discussion section, earlier, above), LED-trilateration is generally inaccurate, unlike the LED-EKF algorithm. The large 99% confidence band for LED-trilateration technique supports this assertion. The RMSE results for different fingerprint maps, indicate that a true fingerprint map (e.g., a map that is measured at every grid point) is the best for both map resolutions, as expected. Otherwise, performance of the three curve-fitting techniques (linear, nonlinear and ANN) are very similar, for the simulation conditions herein. The fit functions generally cause some degree of information loss during the data fitting process, and it is generally not possible to generate a fit function that satisfies the best fit criterion for every pixel value. If such an attempt is made, overfitting may occur, such as leading inaccurate mapping from the image pixel values to power levels as illumination conditions change.

While the examples in this section above refer generally to obtaining imaging information from an imaging sensor included as a portion of an optical transmitter assembly (or an array of such sensors included as a portion of an array of such assemblies), other imaging sensor arrangements can be used. For example, an imaging sensor included as a portion of another device or other UE devices can be used to assist in providing information to update a fingerprint map.

TABLE II

SIMULATION PARAMETERS

| Parameter | Value |
| --- | --- |
| Room dimension (L × W × H) | 5 × 5 × 3 m³ |
| Transmitted power from each LED bulb ($P_t$) | 20 Watts |
| Lambertian mode (m) | 1 |
| LED bulb elevation and azimuth | −90° and 0° |
| Positions of the LED bulbs in the room (x, y, z) (m) | I. (1.25, 1.25, 3) |
| | II. (3.75, 1.25, 3) |
| | III. (3.75, 3.75, 3) |
| | IV. (1.25, 3.75, 3) |
| Height of the PD | 0.75 m |
| Field of view ($\Psi_c$) of the PD | 70° |
| Physical area of the PD ($A_r$) | 1 cm |
| Receiver elevation and azimuth | 90° and 0° |
| Gain of optical filter and refractive index of the lens at the PD | 1.0 and 1.0 |
| Room reflection coefficient (ρ) | 0.8 |
| Image sensor lens aperture | f/2.2 |
| Image sensor focal length and field of view | 29 mm and 73.4° |

Crowd-Sourced Fingerprint Generation Technique

In yet another approach, a fingerprint map can be determined or updated using information obtained using a non-optical wireless communication system. In particular, an 802.11 Wi-Fi network or other wireless network can be used to perform trilateration, and information indicative of UE device position can be determined roughly by such trilateration. In this manner, non-optical wireless network and VLC systems can be used together to enhance positioning accuracy. Non-optical wireless (e.g., RF) access points (APs) are present in almost every indoor space, such as locations like shopping malls, convention or conference centers, industrial plants, etc. In the approach described herein, generation of a fingerprint map, such as capturing a power distribution of optical energy at a plurality of spatial locations, can be aided by at least one device separate from an optical transmitter circuit, and separate from a UE device being tracked.

A hybrid optical/non-optical approach can involve three aspects. In a first aspect, a UE device can use non-optical (e.g., Wi-Fi) trilateration to estimate the UE device position, roughly (e.g., at higher uncertainty as compared to the optically-based technique). In a second aspect, a received light intensity from orthogonally-coded LEDs can be measured, and such a measurement can be assigned to a position earlier identified by the non-optical (e.g., Wi-Fi) trilateration. As the UE device moves around, traversing portions of the region served by the VLC communication system, the light intensity measurements can be aggregated into a spatial map, and such a process can be referred to generally as a form of ad hoc site survey to generate a fingerprint map of the site. A third aspect can include tracking the UE device, or other UE devices, using the learned fingerprint map as an input to a Bayesian estimator such as an EKF or PF as discussed in other examples in this document. Various non-optical wireless trilateration-based approaches can be used, such as an angle-of-arrival (AOA) Kalman filter (KF) tracking technique (not to be confused with the optically-based EKF technique mentioned elsewhere herein).

Trilateration techniques generally rely on accurate estimation of a distance between a transmitter (such as a Wi-Fi AP) and a receiver (e.g., a UE device). A path loss can be modeled using a Friis free-space propagation model, but such a model can be inaccurate. A modified propagation loss model can be denoted as follows:

$$P_r(d)[\text{dBm}] = P_0(d_0)[\text{dBm}] - 10n_p \log_{10}\left(\frac{d}{d_0}\right) + X_\sigma. \quad \text{EQN. 15}$$

As in other examples, Pr can represent received power (in units of decibels referenced to 1 mW in this example) corresponding to RSS at a distance, d, from the transmitter. $P_0(d_0)$ can represent a known or specified reference power corresponding to a distance $d_0$ from the transmitter. The value $n_p$ can be a propagation-environment-dependent path loss exponent, and $X_\sigma$ can represent a zero mean Normal distributed random variable that models random effects in the propagation medium, having a standard deviation, σ. Given the received power, Pr, a distance between the AP and the receiver, d, can be estimated. An unbiased estimate of the distance between the transmitter and the receiver can be modeled as:

$$\hat{d} = d_0\left(\frac{P_r}{P_0(d_0)}\right)^{-1/n_p} \exp\left(-\frac{\sigma^2}{2\left(\frac{10}{\ln(10)}\right)^2 n_p^2}\right) \quad \text{EQN. 16}$$

When a distance between the transmitter and the receiver, and the positions of the transmitters are known, the UE positions can be estimated using a least squares technique. A non-optical wireless trilateration technique does not generally, by itself, provide highly-accurate position estimation. Trilateration-based estimates can include error caused by random effects in the propagation environment; these effects are modeled by the random variable $X_\alpha$ in EQN. 15, above. To accomplish a position estimate using trilateration, at least three transmitters (e.g., APs) are needed.

According to an illustrative example, non-optical wireless trilateration estimates can be aggregated from users walking or otherwise traversing different parts of a region of interest, and a fingerprint map can be generated, as mentioned above. In this illustrative example, N user trajectories are aggregated, and trilateration is done for all N trajectories. A count of sampling points for trilateration for each trajectory in the room can be N, such as can be represented by a trilateration position estimate matrix, $\hat{T}$, having dimensions N×M:

$$\hat{T} = \begin{bmatrix} (x_{11}, y_{11}) & \cdots & (x_{1M}, y_{1M}) \\ (x_{21}, y_{21}) & \cdots & (x_{2M}, y_{2M}) \\ \vdots & \vdots & \vdots \\ (x_{N1}, y_{N1}) & \cdots & (x_{NM}, y_{NM}) \end{bmatrix} \quad \text{EQN. 17}$$

In the position estimate matrix, $\hat{T}$, above, (x, y) represent Cartesian coordinates. The matrix can be used to update the fingerprint map. The received light intensity at the UE device actual position can be assigned to a corresponding estimated position. In an example, a fingerprint map can be a spatial mapping of optical power to Cartesian coordinates in the form of a matrix in which the average received power values are stored. The physical region of interest can be divided into K×J rectangles, and in a manner similar to other examples, the fingerprint map can be denoted as $P=[P_{ij}]$, where i=1, ..., K and j=1, ..., J represent indices of the Cartesian coordinates. The size of the map can be application specific. For example, as in other examples, if a high accuracy is needed for sensitive applications, like autonomous robots used in industrial plants, a comparatively higher-resolution map can be used.

According to illustrative examples, two approaches of using the trilateration results can be used to generate P. The first example is where an initial map can be updated sequentially as users walk into or around a room, and second example can be to use the matrix, $\hat{T}$, in a batch process. In the first approach, the initial fingerprint map, $P^0$, is a matrix of zeros that has the same dimensions as P. For example, after a first user moves in the surveillance area, four operations can be performed: (i) The position of the UE device can be estimated using Wi-Fi trilateration. (ii) A received light intensity can be measured by the UE device at the UE device true (e.g., actual) position. (iii) A trilateration-estimated position and the intensity measurements can be combined. Trilateration generally introduces positioning errors, which can cause a mismatch in the power map. The light intensity measurements will not be assigned to the true positions but the positions found from trilateration. The initial fingerprint map can be updated, and the map can be represented as a sparse matrix at this phase, with nonzero values in the positions found by trilateration. (iv) A light distribution can be represented as a smooth function across the room and from the light source to the floor. In phase (iv), power map information can be smoothed to create a smooth surface, which can then be further updated according to subsequent observations. A surface smoothing methodology can include duplicating a nearest non-zero value.

In the second approach, a system can wait until N users have collected trilateration measurements and optical RSS data in the region of interest. Such observations can then be used to update or otherwise generate the fingerprint map in bulk instead of the sequential processing used in the first approach.

A linear Kalman filter (KF) can be used to smooth the trilateration results after phase (i) of the first approach, mentioned above. The KF can reduce an error between the estimated position and measurements. This filtering operation can reduce bias in the fingerprint map. Once a fingerprint map has been generated, such a survey can then be used by an EKF tracking approach (or a PF tracking approach) as described in other examples in this document. However, the propagation and intensity maps of the region of interest are generally not static. An adaptive fingerprint update scheme can be implemented where new crowd-sourced observations can be used to update the map, P. A mixing rule can be used for such recursive updates, as denoted below:

$$P_{ij}^N = \alpha^\omega P_{ij}^{N-1} + (1-\alpha^\omega)\tilde{P}_{ij}^{N-1} \quad \text{EQN. 18}$$

For the illustrative examples simulated herein, the region of interest is a room, assumed to be an empty room, having dimensions 5×5×3 m³, and a granularity of the power map, $\Delta x$, is 1 dm. The UE device is modeled as moving at a fixed height, and the device orientation is 90° relative to the ceiling. Simulation parameters are included below in Table III.

TABLE III

| Parameter | Value |
|---|---|
| Room dimension (L × W × H) | 5 × 5 × 3 m³ |
| Lambertian mode (m) | 1 |
| LED bulb elevation and azimuth | −90° and 0° |
| Positions of the LED bulbs in the room (x, y, z) (m) | I. (1.25, 1.25, 3) II. (3.75, 1.25, 3) III. (3.75, 3.75, 3) IV. (1.25, 3.75, 3) |
| Height of the PD | 0.75 m |
| Field of view ($\Psi_c$) of the PD | 70° |
| Physical area of the PD ($A_r$) | 1 mm |
| Receiver elevation and azimuth | 90° and 0° |
| Gain of optical filter and refractive index of the lens at the PD | 1.0 and 1.0 |
| Positions of the Wi-Fi APs in the room (x, y, z) (m) | I. (1, 1, 1.5) II. (5, 1, 1.5) III. (5, 5, 1.5) |
| Transmitted power from each Wi-Fi AP ($P_t$) | 40 mW |
| Propagation-environment-dependent path loss exponent ($n_p$) | 4 |
| Reference distance ($d_0$) (x, y) m | (1, 1) |
| Learning rate ($\alpha$) in (6) | 0.5 |
| VLC channel coherence ($\omega$) in (6) | 1 |

A process noise covariance Qt can be chosen to be optimal for the particular trajectories used for simulations, as in other examples, and performance evaluation is performed using a position estimate root mean squared error (RMSE) as a metric. A VLC channel impulse response is not varied, for simplicity. The power map is updated using the bulk or "batch" approach. The map need not updated every time a user is introduced, but the system, in these illustrations, waits until a specified number of trajectories are available. The values ω and α are constant in the mixing equation, so that equal emphasis is placed on the updated power map values and real-time measurements. For the illustrations herein, APs having identical path loss parameters are positioned on three corners of the room.

Figure 14:
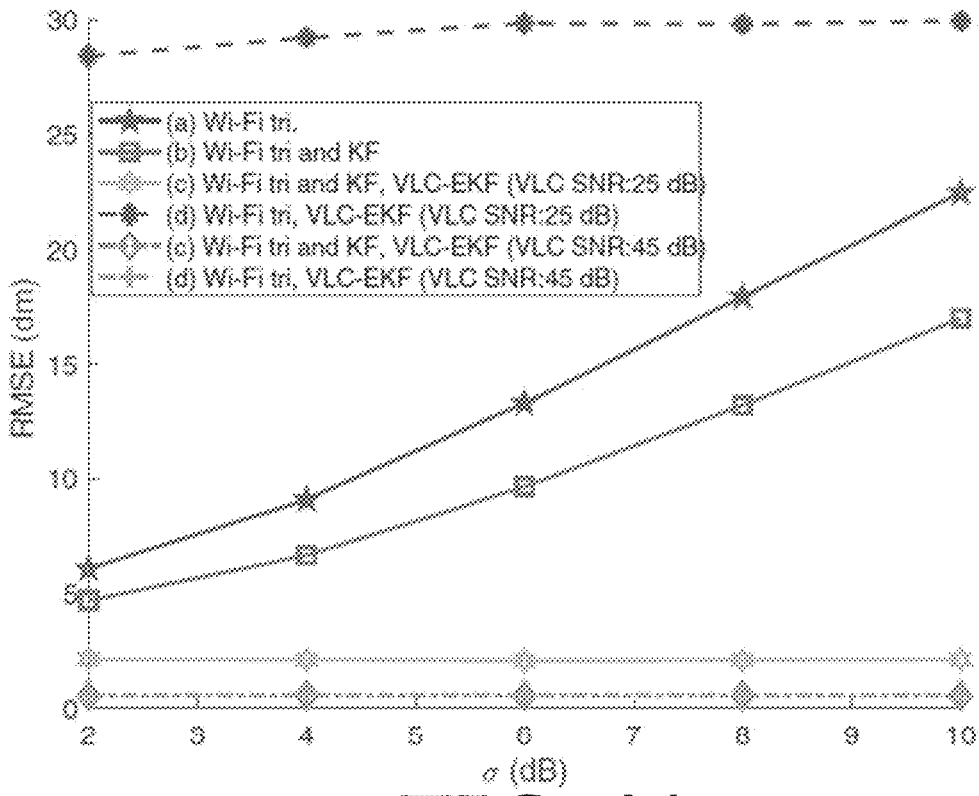
FIG. 14 illustrates generally simulated comparisons between various position tracking approaches including a non-optical wireless trilateration technique for fingerprint map generation (e.g., Wi-Fi trilateration).

FIG. 14 illustrates generally simulated comparisons between various position tracking approaches including a non-optical wireless trilateration technique for fingerprint map generation (e.g., Wi-Fi trilateration). Results are shown corresponding to four approaches:

(a) Wi-Fi trilateration: Respective distances from at least three APs are estimated and the estimated distances are used to solve trilateration equations.

(b) Wi-Fi trilateration and smoothing with a KF: The estimated positions are smoothed using a linear KF.

(c) Wi-Fi trilateration, VLC-EKF: The received light intensity powers at the UE device true positions are assigned to the estimated positions of the UE devices by Wi-Fi trilateration. This approach involves generation of a fingerprint map of the light intensity after smoothing. The fingerprint map can then be used for EKF-based tracking.

(d) Wi-Fi trilateration, KF smoothing, and VLC-EKF: The same as (c); but adding a linear KF to smooth estimates from the Wi-Fi-based trilateration.

The illustrative examples show that as random effects in the propagation medium, $X_\sigma$, increase, the RMSE increases. The estimates can be made more accurate by using a KF on the estimated positions obtained with Wi-Fi trilateration (e.g., a performance shown using (c) is improved in (d) by the introduction of the KF in approach (d)). The KF can decrease error introduced while building P by smoothing the Wi-Fi trilateration measurements.

Generally, at a low SNR (e.g., 25 dB), the uncertainty noise dominates, and a performance of (c) is worse than (d). As the modeled SNR increases, for example, to 45 dB, such error is reduced and the tracking performance of (c) becomes similar to (d). FIG. 14 also illustrates that results for (c) and (d) are not affected by $X_\sigma$, although $X_\sigma$ can affect the Wi-Fi trilateration directly, and the estimated P indirectly.

Figure 15A:
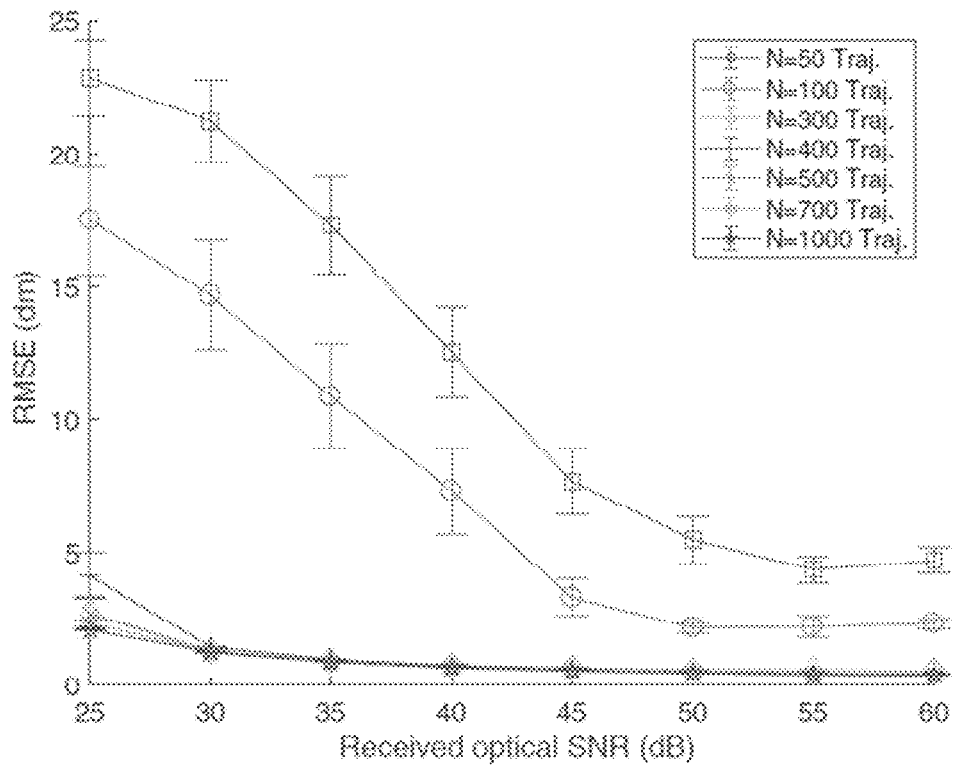
FIGS. 15A and 15B illustrates generally simulated comparisons between various position tracking approaches wherein different counts of UE device trajectories are used in updating a fingerprint map using a non-optical wireless trilateration technique, where the fingerprint map is used in concert with an optically-based position tracking technique.
Figure 15B:
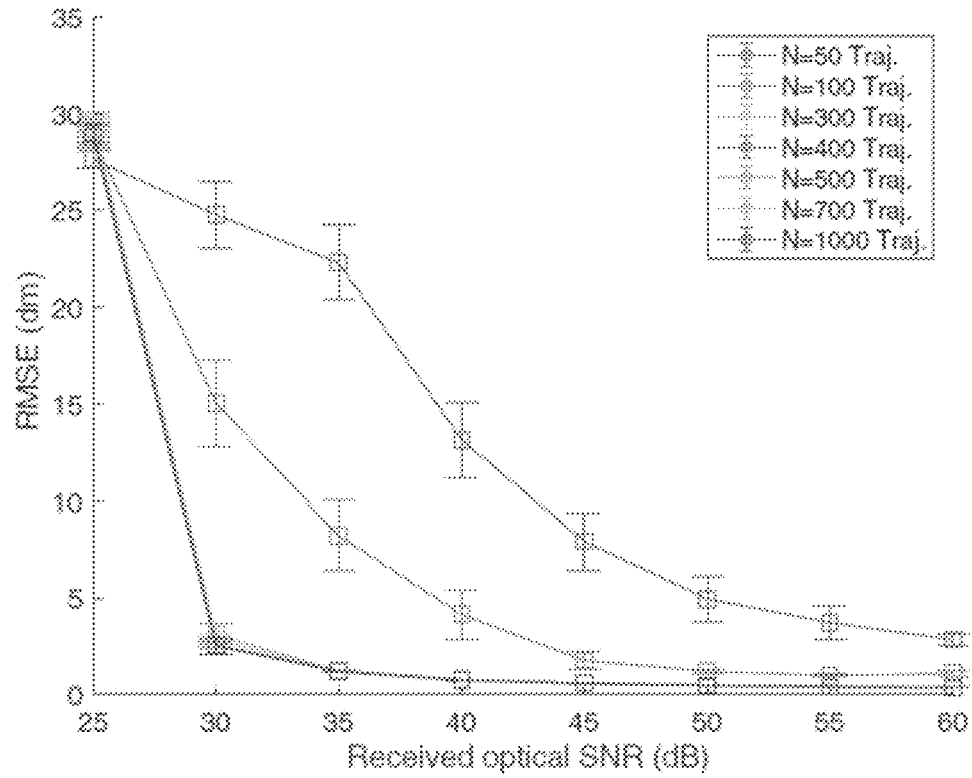

FIGS. 15A and 15B illustrates generally simulated comparisons between various position tracking approaches wherein different counts of UE device trajectories are used in updating a fingerprint map using a non-optical wireless trilateration technique, where the fingerprint map is used in concert with an optically-based position tracking technique. In FIG. 15A, a varying count of UE device trajectories is used to create P and then VLC-EKF tracking can be used, such as corresponding to technique (d), above. The UE device trajectories can be used as a source of crowd-sourced visible light intensity used to build the map, P. According to the results shown in FIG. 15A, for counts higher than about 300 trajectories, the performance is generally indistinguishable. Tracking performance is hardly affected by the value of $X_\sigma$, if crowd-sourcing technique (d) is used, within the context of the simulations herein. An error introduced from the Wi-Fi trilateration during the crowd-sourcing step need not affect the final performance according to the results shown here. FIG. 15A also illustrates that with a light intensity map P defined over a $\Delta x=1$ dm grid, the RMSE reaches the quantization level (less than 0.5 dm) at higher SNR levels. In FIG. 15B, an effect of a count of UE device trajectories on tracking accuracy is evaluated using a technique corresponding to approach (c), above. When comparing FIG. 15A and FIG. 15B, the technique (d) used to generate FIG. 15A is slightly better than technique (c) as shown in FIG. 15B, in terms of accuracy, especially for lower SNR values of about 25 dB to about 30 dB. Such a difference in performance is not as significant for moderate-to-high SNR values.

Figure 16:
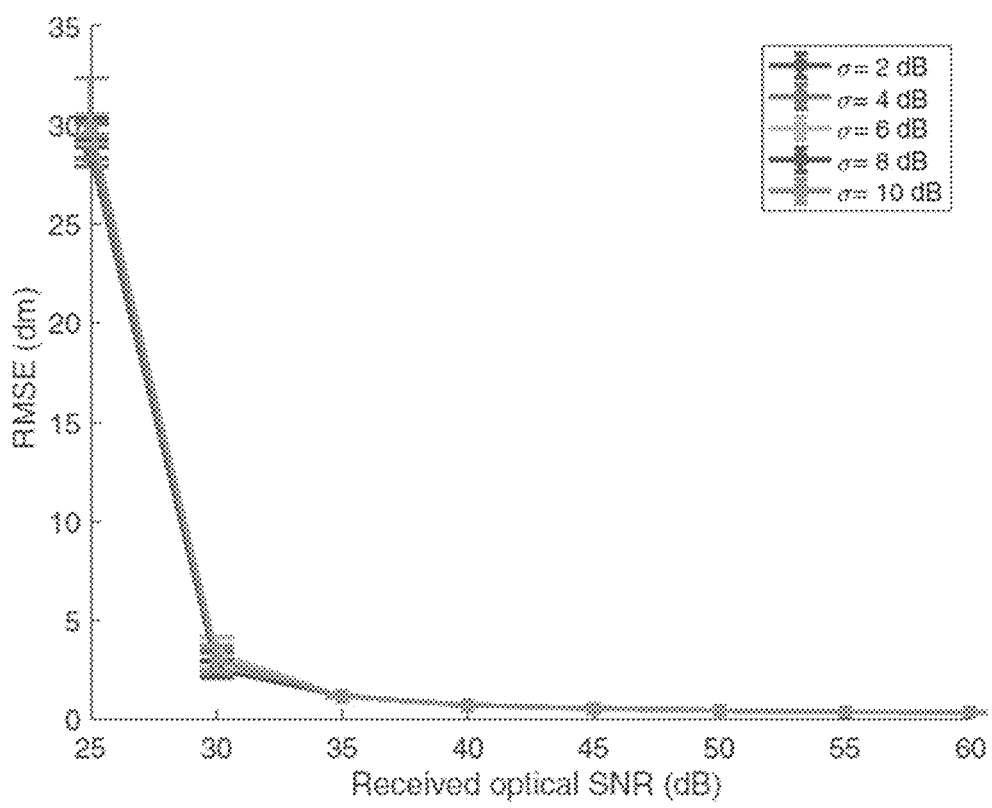
FIG. 16 illustrates generally simulated comparisons between a position tracking approaches wherein different noise contributions are modeled.

FIG. 16 illustrates generally simulated comparisons between a position tracking approaches wherein different noise contributions (SNRs) are modeled. The illustrative example of FIG. 16 was generated using technique (c), above. At low SNR, the performance is far worse than techniques (a), (b), or (d), according to the simulation results. As the SNR increases, the performance converges to similar values as for technique (d). A tradeoff can exist wherein technique (d) generally involves a greater number of calculations due to use of a linear KF applied on the Wi-Fi trilateration solutions, generally yielding higher accuracy, especially for low SNRs, and technique (c) sacrifices accuracy for improved computational efficiency.

VARIOUS NOTES

Each of the non-limiting aspects above can stand on its own, or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A system, comprising:
an optical transmitter circuit, the optical transmitter configured to modulate light provided by an optical emitter to provide an optical communication signal;
a receiver circuit configured to receive information indicative of a measured characteristic of the light emitted from the optical emitter, the measured characteristic obtained from a user equipment (UE) device separate from the optical transmitter;
a location determination circuit comprising a memory circuit and a processor circuit, the memory circuit including information indicative of a fingerprint map of a region containing the UE device, the memory circuit comprising instructions that, when executed by the processor circuit, cause the location determination circuit to estimate, using a Bayesian estimator, a spatial location of the UE device within the region using the fingerprint map and the measured characteristic obtained from the user device;
wherein the measured characteristic is provided as an input to the Bayesian estimator without requiring conversion of the input into a spatial representation of the measured characteristic; and
wherein the fingerprint map includes a mapping of values representing optical intensity to spatial locations within the region.

2. The system of claim 1, wherein the measured characteristic comprises an optical signal strength measured using a photodetector or an optical imaging sensor included as a portion of the UE device.

3. The system of claim 1, wherein the fingerprint map comprises a representation of a power distribution of optical energy received from the optical emitter at a plurality of spatial locations within the region.

4. The system of claim 3, wherein the power distribution of optical energy at the plurality of spatial locations is aided by at least one device separate from the transmitter circuit, the receiver circuit, and the location determination circuit.

5. The system of claim 3, wherein the fingerprint map comprises a representation of a power distribution of optical energy received from the optical emitter determined at least in part using information obtained using a non-optical wireless communication technique.

6. The system of claim 5, wherein the instructions, when performed by the processor circuit, cause the processor circuit to determine the power distribution including mapping a location with the region of an optical sensor to a value of optical power received by the sensor using non-optical wireless trilateration.

7. The system of claim 3, wherein the power distribution of optical energy at the plurality of spatial locations is obtained using an optical imaging sensor located near or included as a portion of an assembly comprising the optical transmitter.

8. The system of claim 7, wherein the power distribution of optical energy at the plurality of spatial locations is obtained using an array of optical imaging sensors, the array comprising respective optical imaging sensors located near or included as a portion of respective optical transmitters.

9. The system of claim 1, wherein the optical transmitter comprises an assembly including two or more light-emitting diode (LED) devices.

10. The system of claim 1, wherein the Bayesian estimator comprises an extended Kalman filter (EKF).

11. The system of claim 10, wherein the memory circuit comprises instructions that cause the location determination circuit to implement the EKF at least in part by linearizing the measured characteristic using a finite-difference technique.

12. The system of claim 1, wherein the Bayesian estimator comprises a particle filter (PF).

13. The system of claim 1, wherein the instructions, when performed by the processor circuit, cause the location determination circuit to at least one of transmit information representing the estimated spatial location of the UE device or present the estimated spatial location of the UE device on a display.

14. The system of claim 1, wherein the instructions, when performed by the processor circuit, determine an estimate of a first or higher order derivative of a time-series representing estimated spatial locations of the UE device.

15. An automated method for estimating a spatial location of a user equipment (UE) device, comprising:
receiving a fingerprint map of a region containing the UE device;
receiving information indicative of a measured characteristic of light emitted from an optical emitter comprising a portion of an optical transmitter, the optical transmitter to modulate light provided by the optical emitter;
estimating, using a Bayesian estimator, a spatial location of the UE device within the region using the fingerprint map and the measured characteristic obtained from the user device;
wherein the measured characteristic is provided as an input to the Bayesian estimator without requiring conversion of the input into a spatial representation of the measured characteristic; and
wherein the fingerprint map includes a mapping of optical intensity values to spatial locations within the region.

16. The method of claim 15, wherein the measured characteristic comprises an optical signal strength measured using a photodetector or an optical imaging sensor.

17. The method of claim 16, wherein the fingerprint map comprises a representation of a power distribution of optical energy received from the optical emitter at a plurality of spatial locations within the region.

18. The method of claim 16, wherein the fingerprint map comprises a representation of a power distribution of optical energy received from the optical emitter determined at least in part using information obtained using a non-optical wireless communication technique.

19. The method of claim 18, wherein determining the power distribution includes mapping a location with the region of an optical sensor to a value of optical power received by the sensor using non-optical wireless trilateration.

20. The method of claim 16, wherein the Bayesian estimator comprises an extended Kalman filter (EKF).

21. The method of claim 15, wherein the Bayesian estimator comprises a particle filter (PF).

22. The method of claim 15, comprising at least one of transmitting information representing the estimated spatial location of the UE device or presenting the estimated spatial location of the UE device on a display.

23. The method of claim 15, comprising determining an estimate of a first or higher order derivative of a time-series representing estimated spatial locations of the UE device.

24. A system for optical communication including facilities for automated determination of a location of a user equipment (UE) device in a region served by the system, the system comprising:
- an optical transmitter means to modulate light to provide an optical communication signal;
- a means for receiving information indicative of a measured characteristic of the light emitted from the optical transmitter means, the measured characteristic obtained from the UE device;
- a location determination means to estimate, using an automated implementation of a Bayesian estimator, a spatial location of the UE device within the region using a fingerprint map of the region and the measured characteristic obtained from the user device;
- wherein the measured characteristic is provided as an input to the Bayesian estimator without requiring conversion of the input into a spatial representation of the measured characteristic; and
- wherein the fingerprint map includes a mapping of optical intensity values to spatial locations within the region.

25. The system of claim 24, wherein the Bayesian estimator comprises an extended Kalman filter (EKF) or a particle filter (PF).

* * * * *